(12) United States Patent
Li et al.

(10) Patent No.: US 12,222,766 B2
(45) Date of Patent: Feb. 11, 2025

(54) BENDABLE DISPLAY MODULE AND DEVICE

(71) Applicant: Huawei Technologies Co., Ltd., Shenzhen (CN)

(72) Inventors: Qiang Li, Shanghai (CN); Tao Sun, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 17/759,206

(22) PCT Filed: Jan. 5, 2021

(86) PCT No.: PCT/CN2021/070329
§ 371 (c)(1),
(2) Date: Jul. 21, 2022

(87) PCT Pub. No.: WO2021/147663
PCT Pub. Date: Jul. 29, 2021

(65) Prior Publication Data
US 2023/0050666 A1     Feb. 16, 2023

(30) Foreign Application Priority Data
Jan. 22, 2020   (CN) .......................... 202020146302.0

(51) Int. Cl.
*G06F 1/16* (2006.01)
(52) U.S. Cl.
CPC .......... *G06F 1/1656* (2013.01); *G06F 1/1616* (2013.01); *G06F 1/1652* (2013.01); *G06F 1/1681* (2013.01)

(58) Field of Classification Search
CPC .... G06F 1/1652; G06F 1/1616; G06F 1/1637; G06F 1/1641; H05K 5/0217; H05K 2201/10128; H05K 2201/056; H05K 1/056
See application file for complete search history.

(56) References Cited

U.S. PATENT DOCUMENTS

2016/0357052 A1   12/2016   Kim et al.
2018/0070460 A1   3/2018   Han
(Continued)

FOREIGN PATENT DOCUMENTS

CN    208141720 U    11/2018
CN    109545087 A    3/2019
(Continued)

*Primary Examiner* — James Wu
*Assistant Examiner* — Dakota M Talbert
(74) *Attorney, Agent, or Firm* — Slater Matsil, LLP

(57) ABSTRACT

This application provides a display module and an electronic device. A display module includes a first buffer member, and a first non-bending region, a bending region, and a second non-bending region. A support member is fastened on the display screen. A first metal plate member of the support member faces the first non-bending region. A first connection plate member of the support member faces the bending region. A second metal plate member of the support member faces the second non-bending region. The first connection plate member is provided with grooves. Openings of the grooves are located on a first surface of the metal part. Organic material are located in the grooves, and are connected to the metal part. The first buffer member is located between the first metal plate member and the second metal plate member.

14 Claims, 14 Drawing Sheets

(56) References Cited

U.S. PATENT DOCUMENTS

| | | | |
|---|---|---|---|
| 2018/0122830 A1* | 5/2018 | Kachatryan | B32B 27/286 |
| 2019/0036068 A1* | 1/2019 | Kim | G06F 1/1601 |
| 2019/0131575 A1* | 5/2019 | Peng | H10K 50/82 |
| 2019/0141843 A1 | 5/2019 | Park et al. | |
| 2019/0204872 A1 | 7/2019 | Lee | |
| 2020/0006681 A1 | 1/2020 | Kim | |

FOREIGN PATENT DOCUMENTS

| | | | | |
|---|---|---|---|---|
| CN | 208607861 U | | 3/2019 | |
| CN | 208806017 U | | 4/2019 | |
| CN | 109903679 A | * | 6/2019 | H01L 51/0097 |
| CN | 109994044 A | | 7/2019 | |
| CN | 110085640 A | | 8/2019 | |
| CN | 110277022 A | | 9/2019 | |
| CN | 110336904 A | | 10/2019 | |
| CN | 110444121 A | | 11/2019 | |
| CN | 110649058 A | | 1/2020 | |
| CN | 110660329 A | | 1/2020 | |
| CN | 209928187 U | | 1/2020 | |
| CN | 111508357 A | | 8/2020 | |
| CN | 111583803 A | | 8/2020 | |
| CN | 211455154 U | | 9/2020 | |
| CN | 211455155 U | | 9/2020 | |
| CN | 211455156 U | | 9/2020 | |
| CN | 211481295 U | | 9/2020 | |
| RU | 2683290 C2 | | 3/2019 | |
| WO | 2018232609 A1 | | 12/2018 | |

* cited by examiner

BENDABLE DISPLAY MODULE AND DEVICE

CROSS-REFERENCE TO RELATED APPLICATIONS

This application is a national stage of International Application No. PCT/CN2021/070329, filed on Jan. 5, 2021, which claims priority to Chinese Patent Application No. 202020146302.0, filed on Jan. 22, 2020. Both of the aforementioned applications are hereby incorporated by reference in their entireties.

TECHNICAL FIELD

This application relates to the field of electronic device technologies, and in particular, to a display module and an electronic device.

BACKGROUND

Because a flexible display screen has advantages of being light and thin, not fragile, foldable, rollable, and the like, the flexible display screen is widely used in electronic products such as mobile phones. However, in a conventional mobile phone, a flexible display screen has poor hardness, and a surface easily collapses. Therefore, a support sheet is disposed on a bottom side of the conventional flexible display screen, so that the flexible display screen is supported by using the support sheet, to resolve a problem that the surface of the flexible display screen collapses. However, when the support sheet is thick, the support sheet restricts bending of the flexible display screen. Consequently, the mobile phone is not easily folded. When the support sheet is thin, although the support sheet does not restrict bending of the flexible display screen, the excessively thin support sheet does not have sufficient structural strength, and cannot support the flexible display screen well.

SUMMARY

This application provides a display module and an electronic device that are easily folded and have sufficient support strength.

According to a first aspect, this application provides a display module. The display module includes a display screen and a support member. The display screen includes a first non-bending region, a bending region, and a second non-bending region that are successively connected. In other words, the bending region is connected between the first non-bending region and the second non-bending region. The support member is fastened on a non-display side of the display screen. The support member includes a first metal plate member, a first connection plate member, and a second metal plate member that are successively connected. In other words, the first connection plate member is connected between the first metal plate member and the second metal plate member. The first metal plate member faces the first non-bending region. The first connection plate member faces the bending region. The second metal plate member faces the second non-bending region. The first connection plate member is capable of being bent.

In addition, the first connection plate member includes a metal part and organic material parts. The metal part is provided with a plurality of grooves. Openings of the plurality of grooves are located on a first surface of the metal part. The organic material parts are located in the plurality of grooves, and are fixedly connected to the metal part. The support member further includes a first buffer member. The first buffer member is located between the first metal plate member and the second metal plate member. The first buffer member is stacked on the first surface of the metal part, and is fixedly connected to the organic material parts.

It may be understood that hardness of the metal part are greater than hardness of the organic material parts. It may be understood that stiffness of the metal part are greater than stiffness of the organic material parts. In this case, because the first connection plate member has both the metal part and the organic material parts, overall stiffness and hardness of the first connection plate member are moderate. When an electronic device is in an unfolded state, the first connection plate member has sufficient stiffness and hardness to support the bending region of the display screen, to prevent the bending region of the display screen from collapsing, namely, to ensure that the display screen has good surface flatness. When the electronic device is unfolded or folded, because the first connection plate member has good flexibility, the first connection plate member less affects bending of the display screen. In other words, when the electronic device is folded or unfolded, the organic material parts can absorb stress generated during bending.

In addition, a first support plate, a second support plate, and a third support plate of a rotation apparatus are generally provided with a large quantity of grooves or through holes. The groove or the through hole may serve as avoidance space for a component or be used to tighten a fastener. In a solution in which the first connection plate member is provided with grooves and no organic material part is not disposed in the grooves, when the electronic device is in an unfolded state, peripheral edges of the grooves or the through holes on the first support plate, the second support plate, and the third support plate of the rotation apparatus easily extrude the first connection plate member. Because stress on peripheral edges of the grooves of the first connection plate member is concentrated, the peripheral edges of the grooves can extrude optical clear adhesive with large extrusion force, and the optical clear adhesive protrudes. Consequently, a black spot, a bright line, or the like occurs on the display screen. However, in this implementation, the organic material parts are disposed in the grooves of the metal part. Therefore, when the peripheral edges of the grooves or the through holes on the first support plate, the second support plate, and the third support plate of the rotation apparatus extrude the first connection plate member, the organic material parts may absorb partial extrusion force, to prevent the stress on the peripheral edges of the grooves from being excessively concentrated, namely, to prevent the optical clear adhesive from protruding due to excessive extrusion. Therefore, a black spot, a bright line, or the like is prevented from occurring on the display screen.

In addition, when the peripheral edges of the grooves or the through holes on the first support plate, the second support plate, and the third support plate extrude the first connection plate member, the first connection plate member transfers extrusion force to the first buffer member. In this case, the first buffer member may also absorb partial extrusion force to further prevent a black spot, a bright line, or the like from occurring on the display screen due to excessive extrusion.

In addition, when the peripheral edges of the grooves or the through holes on the first support plate, the second support plate, and the third support plate extrude the first connection plate member, if the first connection plate member is broken and extrudes the display screen, the first buffer member may also prevent the broken first connection plate member from directly piercing or extruding the display screen. Therefore, a black spot, a bright line, or the like is prevented, to a large degree, from occurring on the display screen.

In addition, hardness and stiffness of the first metal plate member and the second metal plate member are large. In this case, when the electronic device is folded or unfolded, the first metal plate member has good hardness and stiffness to support the first non-bending region of the display screen, and the second metal plate member has good hardness and stiffness to support the second non-bending region of the display screen. Therefore, the display screen is prevented from collapsing, namely, it is ensured that the display module has good surface flatness.

In addition, the first metal plate member, the first connection plate member, the second metal plate member, and the first buffer member can form an integral component (the support member). In this case, a manner in which the support member as the integral component is mounted on the display screen is simple, namely, an assembly manner of the display module can be simplified.

In an implementation, the first surface faces the display screen. In other words, the opening of the groove faces the display screen. In addition, the first buffer member is fastened between the first connection plate member and the display screen. The metal part further includes a second surface opposite to the first surface, and the second surface is a complete and continuous surface. It may be understood that "a complete and continuous surface" means that the second surface is flat and is provided with no groove or through hole. In this case, the first connection plate member has good integrity. When the peripheral edges of the grooves or the through holes on the first support plate, the second support plate, and the third support plate extrude the first connection plate member, the first connection plate member has sufficient strength to resist extrusion force. Therefore, the first connection plate member is prevented from being broken, and protrusion is prevented from occurring at a position due to concentrated stress.

In an implementation, the first surface faces away from the display screen. In other words, the opening of the groove faces away from the display screen. In addition, the first buffer member is fastened on a surface that is of the first connection plate member and that faces away from the display screen. The metal part further includes a second surface opposite to the first surface. The second surface is a complete and continuous surface. In this case, a surface that is of a second connection plate member and that is connected to the display screen is a flat surface. When the peripheral edges of the grooves or the through holes on the first support plate, the second support plate, and the third support plate extrude the first connection plate member, the first connection plate member has sufficient hardness and strength to resist extrusion force. Therefore, the first connection plate is prevented from piercing the display screen because the first connection plate is broken.

In an implementation, the metal part further includes a second surface opposite to the first surface. The support member further includes a second buffer member. The second buffer member is stacked on the second surface of the metal part. In other words, the first buffer member is opposite to the second buffer member. The first buffer member is fastened between the first connection plate member and the display screen. The second buffer member is fastened on a surface that is of the first connection plate member and that faces away from the display screen.

It may be understood that the first buffer member is disposed on the first surface of the first connection plate member, and the second buffer member is disposed on the second surface of the first connection plate member. Therefore, flexibility of the support member facing the bending region of the display screen is significantly improved. In this case, when the electronic device is unfolded or folded, the support member facing the bending region can reduce an impact on the display screen in a bending process. In other words, when the electronic device is folded or unfolded, the first buffer member and the second buffer member can jointly absorb the stress generated during bending.

In addition, the first buffer member is disposed on a surface that is of the first connection plate member and that is close to the display screen, and the second buffer member is disposed on the surface that is of the first connection plate member and that faces away from the display screen. Therefore, when the electronic device is in an unfolded state, the peripheral edges of the grooves or the through holes on the first support plate, the second support plate, and the third support plate of the rotation apparatus extrude the second buffer member. In this way, because the second buffer member has good flexibility, the second buffer member has sufficient flexibility to absorb partial extrusion force. In this case, the stress on the peripheral edges of the grooves of the metal part is not concentrated, namely, force with which the peripheral edges of the grooves of the metal part extrudes the display screen is small. Therefore, a black spot, a bright line, or the like is prevented, to a large degree, from occurring on the display screen. In addition, when the second buffer member transfer partial extrusion force to the first buffer member by using the first connection plate member, the first buffer member can also absorb partial extrusion force again. In this case, large extrusion force exerted on the display screen is further reduced. Therefore, a black spot, a bright line, or the like is prevented, to a large degree, from occurring on the display screen.

In an implementation, in a thickness direction of the display module, a thickness from a bottom wall of the groove to a surface that is of the metal part and that faces away from the display screen ranges from 0.01 millimeter to 0.05 millimeter. In this way, the metal part can have good flexibility while the hardness and the stiffness of the metal part are ensured. In other words, the hardness and the stiffness of the first connection plate member are moderate. Therefore, when the electronic device is in an unfolded state, the first connection plate member has sufficient stiffness and hardness to support the bending region of the display screen, to prevent the bending region of the display screen from collapsing. When the electronic device is unfolded or folded, because the first connection plate member has good flexibility, the first connection plate member less affects bending of the display screen.

In an implementation, the first buffer member and the organic material parts are an integrally formed structure. In this case, the first buffer member and the organic material parts have good integrity, and firmness of a connection between the first buffer member and the organic material parts is also good.

In an implementation, a material of the organic material part includes P4U. The material of the organic material part further includes at least one of PU, TPU, TPE, TPR, TPV, and EVA.

It may be understood that when the electronic device is normally used (namely, when the electronic device is not collided or impacted), the P4U and the PU can maintain soft, namely, an elastic modulus of the first connection plate member is small. In this case, when the electronic device is unfolded or folded, the first connection plate member less affects folding or unfolding of the display screen, namely, the P4U and the PU can ensure that the first connection plate member has a good bending property.

In addition, when the electronic device is collided or impacted, the P4U and the PU are severely collided or impacted by the metal part. In this case, molecules in the P4U and the PU can immediately lock each other, and quickly shrink and harden. In this case, the elastic modulus of the first connection plate member is significantly increased to prevent the display screen from being deformed due to extrusion by the first connection plate member. When impact force or extrusion force exerted on the P4U and the PU disappears, the P4U and the PU can quickly return to soft, namely, the P4U and the PU change from being hard to being soft. Therefore, it is ensured that the display module can continue to be bent or unfolded.

In an implementation, a material of the organic material part includes ultraviolet-cured adhesive or thermal-cured adhesive.

In this implementation, when the material of the organic material part includes the ultraviolet-cured adhesive or the thermal-cured adhesive, firmness of a connection between the organic material parts and the metal part is good, and the first connection plate member formed by the organic material parts and the metal part has good integrity. In addition, a formation manner of the organic material part is simple and easy to operate.

In an implementation, the plurality of grooves form a plurality of first grooves groups. The plurality of first groove groups are arranged in a first direction. Each first groove group includes a plurality of first grooves. A plurality of first grooves in a same first groove group are arranged at intervals in a second direction. A plurality of first grooves in two adjacent first groove groups alternate with each other. The second direction is a direction in which the first metal plate member faces the second metal plate member. The first direction is perpendicular to the second direction. For example, the first direction may be a width direction of the electronic device, namely, an X-axis direction, and the second direction may be a length direction of the electronic device, namely, a Y-axis direction.

In this implementation, the first groove groups are disposed on the metal part, so that overall flexibility of the first connection plate member can be improved to ensure that the display module has good flexibility. In addition, when the organic material parts are disposed in the first grooves, the overall flexibility of the first connection plate member can be further improved. In this case, when the electronic device is folded or unfolded, the organic material parts disposed in the first groove groups can effectively absorb bending force, so that folding and unfolding of the electronic device are not affected.

In an implementation, the first groove is a strip hole. An extension direction of the first groove is parallel to the first direction. A width of the first groove in the second direction ranges from 0.15 millimeter to 3 millimeters.

In this implementation, when the extension direction of the first groove is parallel to the X-axis direction, and the width of the first groove in the Y-axis direction ranges from 0.15 millimeter to 3 millimeters, an area that is of a hollow-out region formed by the metal part and that is on an X-Y plane is large. In this case, an area that is of the organic material part disposed in the first groove and that is on the X-Y plane is also large. Therefore, when the electronic device is unfolded or folded, the organic material parts can absorb the stress generated in the bending process, namely, the display module is prevented from being not easily bent due to excessively large stress on the metal part. Therefore, a bending effect of the display module is improved.

It may be understood that, to ensure that the support member has large hardness and stiffness, the grooves disposed on the support member are generally small. In this implementation, the organic material parts are disposed in the first grooves, and the organic material parts may improve the hardness and the stiffness of the first connection plate member to a degree. In this case, a size of the first groove disposed on the metal part is large (specifically, on the Y-axis, a maximum value of the width of the first groove may be up to 3 millimeters). In addition, in a process of manufacturing the support member, a quantity of manufactured first grooves may be reduced to a large degree. Therefore, input costs of the support member are reduced.

In an implementation, the support member further includes a second connection plate member and a third metal plate member that face the bending region of the display screen, and the first metal plate member, the second connection plate member, the third metal plate member, the first connection plate member, and the second metal plate member are successively connected. The second connection plate member is provided with grooves. The second connection plate member includes a metal part and organic material parts. The support member further includes a third buffer member. The third buffer member is located between the first metal plate member and the third metal plate member. The third buffer member is stacked on the second connection plate member.

In this implementation, because the second connection plate member has both the metal part and the organic material parts, overall hardness and stiffness of the second connection plate member are moderate. In addition, the second connection plate member is stacked with the third buffer member. In this case, flexibility of a partial region of the support member may be improved through cooperation between the second connection plate member and the third buffer member. In this case, a quantity of regions with good flexibility on the support member may be increased. Therefore, when the support member is fastened to the display screen, the second connection plate member may also be fastened to a region with a large bending angle in the bending region of the display screen, to ensure that the bending region of the display screen has a good bending effect.

According to a second aspect, this application provides another display module. The display module includes a display screen and a support member. The display screen includes a first non-bending region, a bending region, and a second non-bending region that are successively connected. In other words, the bending region is connected between the first non-bending region and the second non-bending region. The support member is fastened on a non-display side of the display screen. The support member includes a first metal plate member, a first connection plate member, and a second metal plate member that are successively connected. In other words, the first connection plate member is connected between the first metal plate member and the second metal plate member. The first metal plate member faces the first non-bending region. The first connection plate member faces the bending region. The second metal plate member faces the second non-bending region. The first connection plate member is capable of being bent.

The first connection plate member includes a metal part and organic material parts. The metal part is provided with a plurality of grooves. Openings of the plurality of grooves are located on a first surface of the metal part. The organic material parts are located in the plurality of grooves, and are fixedly connected to the metal part.

In a thickness direction of the display module, a height of the metal part is equal to a height of the first metal plate member and a height of the second metal plate member.

In a second direction, a width of the organic material part ranges from 0.15 millimeter to 3 millimeters, and a width of the metal part between two adjacent organic material parts ranges from 0.05 millimeter to 0.8 millimeter. The second direction is a direction in which the first metal plate member faces the second metal plate member.

It may be understood that hardness of the metal part are greater than hardness of the organic material parts. It may be understood that stiffness of the metal part are greater than stiffness of the organic material parts. In this case, the first connection plate member has both the metal part and the organic material parts, the width of the organic material part ranges from 0.15 millimeter to 3 millimeters, and the width of the metal part between two adjacent organic material parts ranges from 0.05 millimeter to 0.8 millimeter. Therefore, overall stiffness and hardness of the first connection plate member are moderate. In other words, the first connection plate member has good hardness, stiffness, and flexibility. When an electronic device is in an unfolded state, the first connection plate member has sufficient stiffness and hardness to support the bending region of the display screen, to prevent the bending region of the display screen from collapsing or being pitted, namely, to ensure that the display module has good surface flatness. When the electronic device is unfolded or folded, the first connection plate member does not hinder the display screen from being bent.

In addition, the organic material parts are disposed in the grooves of the metal part, so that the metal part and the organic material parts form an integral structure, namely, the first connection plate member has good integrity. In this case, firmness of a connection between the metal part and the organic material parts is good. Therefore, when peripheral edges of grooves or through holes on a first support plate, a second support plate, and a third support plate extrude the first connection plate member, because the firmness of the connection between the metal part and the organic material parts is good, the metal part is not easily broken to pierce or extrude the display screen.

In addition, when the peripheral edges of the grooves or the grooves on the first support plate, the second support plate, and the third support plate of a rotation apparatus extrude the first connection plate member, the organic material parts can absorb partial extrusion force. In this case, stress on peripheral edges of the grooves is not excessively concentrated. Therefore, optical clear adhesive is prevented from protruding due to excessive extrusion, so that a black spot, a bright line, or the like is prevented from occurring on the display screen.

In an implementation, a material of the organic material part includes P4U. The material of the organic material part further includes at least one of PU, TPU, TPE, TPR, TPV, and EVA.

It may be understood that when the electronic device is normally used (namely, when the electronic device is not collided or impacted), the P4U and the PU can maintain soft, namely, an elastic modulus of the first connection plate member is small. In this case, when the electronic device is unfolded or folded, the first connection plate member less affects folding or unfolding of the display screen, namely, the P4U and the PU can ensure that the first connection plate member has a good bending property.

In addition, when the electronic device is collided or impacted, the P4U and the PU are severely collided or impacted by the metal part. In this case, molecules in the P4U and the PU can immediately lock each other, and quickly shrink and harden. In this case, the elastic modulus of the first connection plate member is significantly increased to prevent the display screen from being deformed due to extrusion by the first connection plate member. When impact force or extrusion force exerted on the P4U and the PU disappears, the P4U and the PU can quickly return to soft, namely, the P4U and the PU change from being hard to being soft. Therefore, it is ensured that the display module can continue to be bent or unfolded.

In an implementation, in the thickness direction of the display module, a thickness from a bottom wall of the groove to a surface that is of the metal part and that faces away from the display screen ranges from 0.01 millimeter to 0.05 millimeter. In this way, the metal part can have good flexibility while the hardness and the stiffness of the metal part are ensured. In other words, the hardness and the stiffness of the first connection plate member are moderate. Therefore, when the electronic device is in an unfolded state, the first connection plate member has sufficient stiffness and hardness to support the bending region of the display screen, to prevent the bending region of the display screen from collapsing. When the electronic device is unfolded or folded, because the first connection plate member has good flexibility, the first connection plate member less affects bending of the display screen.

According to a third aspect, this application provides an electronic device. The electronic device includes a housing and the foregoing display module. The display module is mounted in the housing.

In this implementation, the display module is easily folded and has sufficient support strength. When the display module is applied to an electronic device, the electronic device is also easily folded and also has sufficient support strength.

DETAILED DESCRIPTION OF ILLUSTRATIVE EMBODIMENTS

Figure 1:
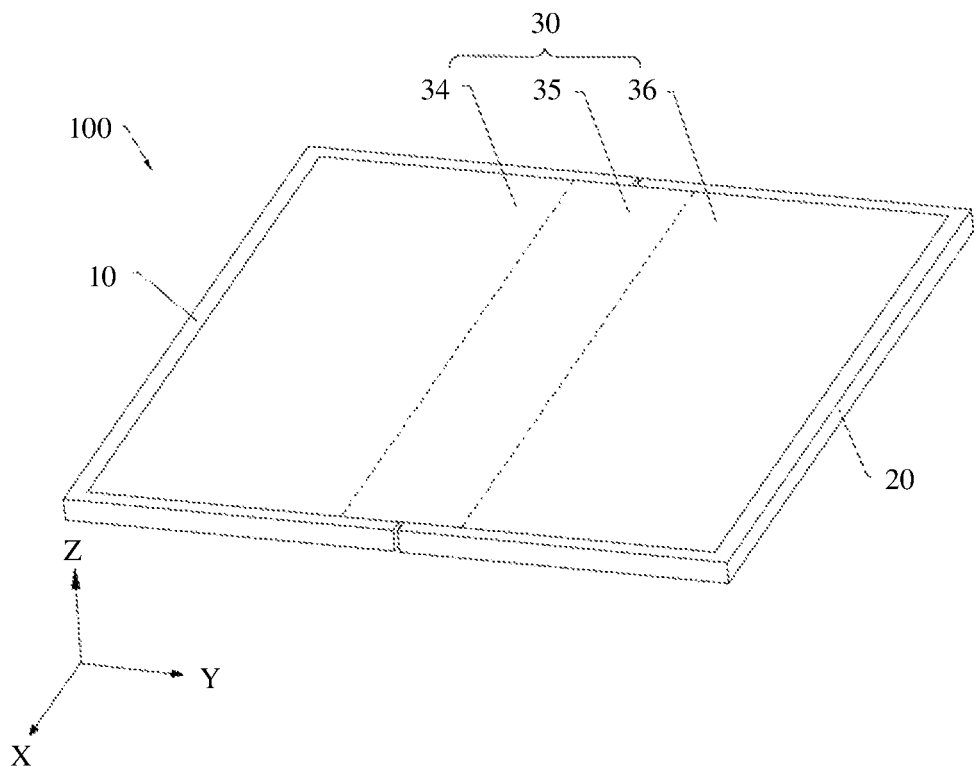
FIG. 1 is a schematic diagram of a structure of an electronic device in an unfolded state according to an embodiment of this application.

FIG. 1 is a schematic structural diagram of an electronic device in an unfolded state according to an embodiment of this application. An electronic device 100 may be a tablet computer, a mobile phone, a camera, a personal computer, a notebook computer, a vehicle-mounted device, or a wearable device. The electronic device 100 in the embodiment shown in FIG. 1 is described by using the mobile phone as an example. For ease of description, as shown in FIG. 1, a width direction of the electronic device 100 is defined as an X-axis, a length direction of the electronic device boo is defined as a Y-axis, and a thickness direction of the electronic device 100 is defined as a Z-axis.

Figure 2:
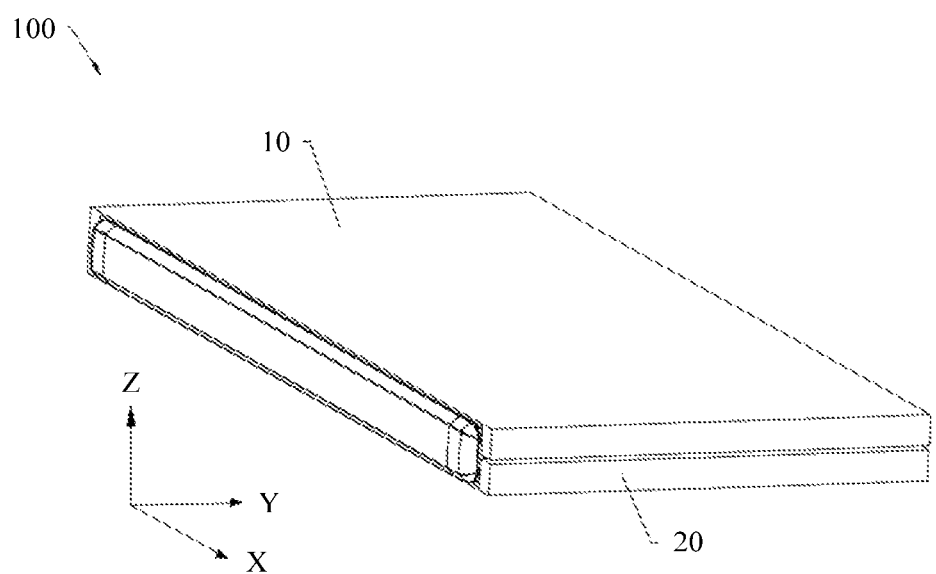
FIG. 2 is a schematic diagram of a structure of the electronic device shown in FIG. 1 in a folded state.

With reference to FIG. 1, FIG. 2 is a schematic structural diagram of the electronic device shown in FIG. 1 in a folded state.

The electronic device 100 includes a first housing 10, a second housing 20, and a display module 30. The first housing 10 and the second housing 20 can be unfolded relative to each other to be in an unfolded state. The first housing 10 and the second housing 20 can also be folded relative to each other to be in a folded state. In other words, the first housing 10 and the second housing 20 can be switched between a folded state and an unfolded state. FIG. 1 shows that the electronic device 100 is in an unfolded state. FIG. 2 shows that the electronic device 100 is in a folded state. It may be understood that FIG. 1 shows that a direction in which the first housing 10 faces the second housing 20 is a positive direction of the Y-axis.

In addition, the display module 30 may be configured to display an image, a video, and the like. The display module 30 includes a first part 34, a second part 35, and a third part 36. The second part 35 is connected between the first part 34 and the third part 36. The first part 34, the second part 35, and the third part 36 are all located on a same side of the first housing 10 and the second housing 20. In addition, the first part 34 is fastened to the first housing 10. The second part 35 is located between the first housing 10 and the second housing 20. The third part 36 is fastened to the second housing 20.

It may be understood that when the electronic device 100 is in an unfolded state, the first part 34, the second part 35, and the third part 36 are approximately at 180° (a slight deviation is allowed, for example, 165°, 177°, or 185°). In this case, the display module 30 has a continuous display region with a large area, namely, the display module 30 can implement large-screen display, and user experience is good. When the electronic device 100 is in a folded state, the display module 30 is folded. Specifically, the second part 35 is bent. The first part 34 and the third part 36 overlap each other in the Z axis. In this case, an unfolded area of the display module 30 is small. This helps reduce a probability that the display module 30 is damaged.

In addition, FIG. 2 shows that when the electronic device 100 is in a folded state, the display module 30 is located between the first housing 10 and the second housing 20, namely, the display module 30 can be folded inwards. In another implementation, when the electronic device 100 is in a folded state, the first housing 10 and the second housing 20 may be located between the first part 34 and the third part 36, namely, the display module 30 can be folded outwards. Specifically, this is not limited in this embodiment.

In addition, both FIG. 1 and FIG. 2 show that the electronic device 100 may be folded once. In another implementation, the electronic device 100 may be folded a plurality of times, namely, the display module 30 may include a plurality of parts. Folding may occur between every two parts.

Figure 3:
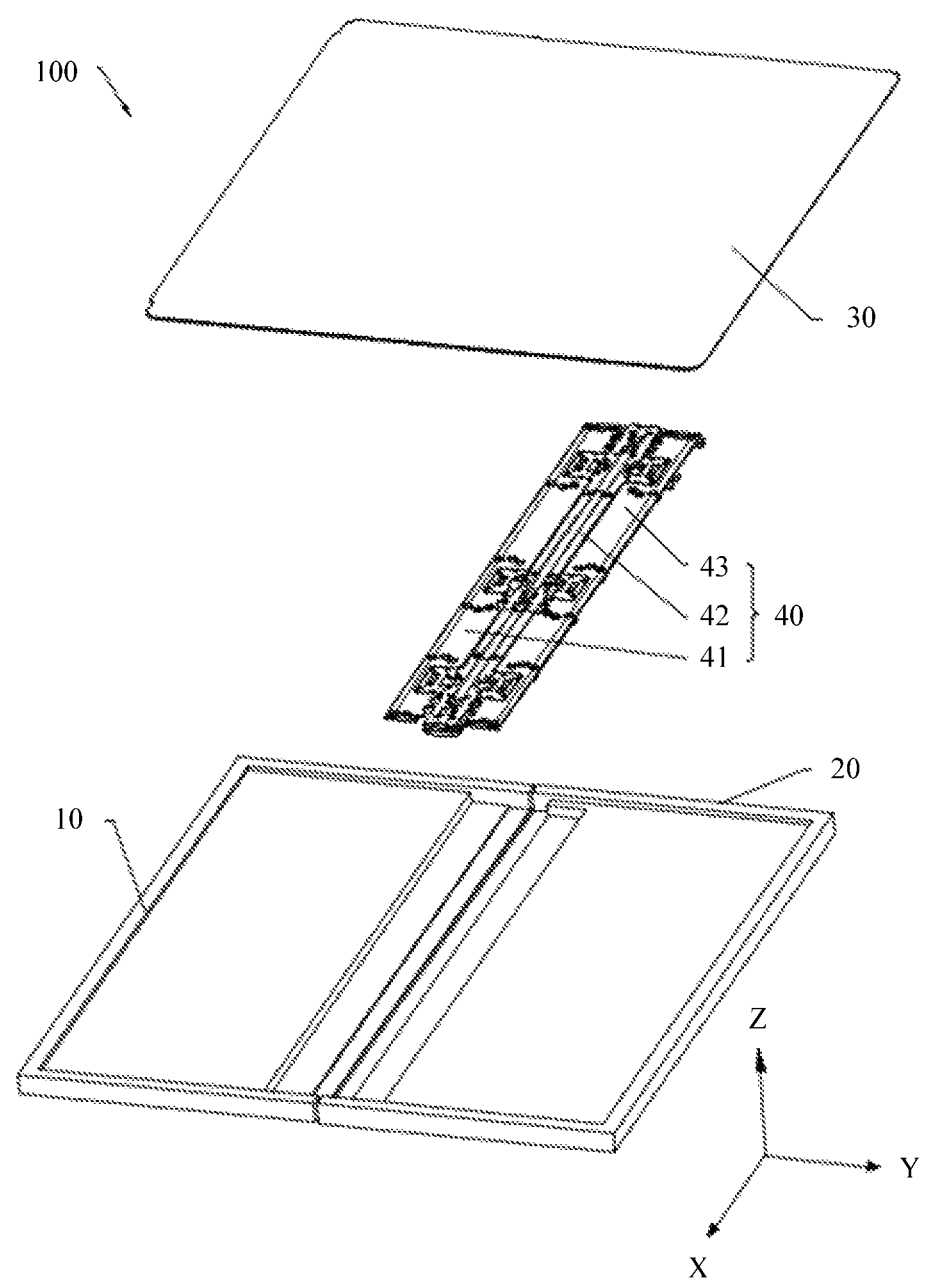
FIG. 3 is a partial schematic exploded view of the electronic device shown in FIG. 1.
Figure 4:
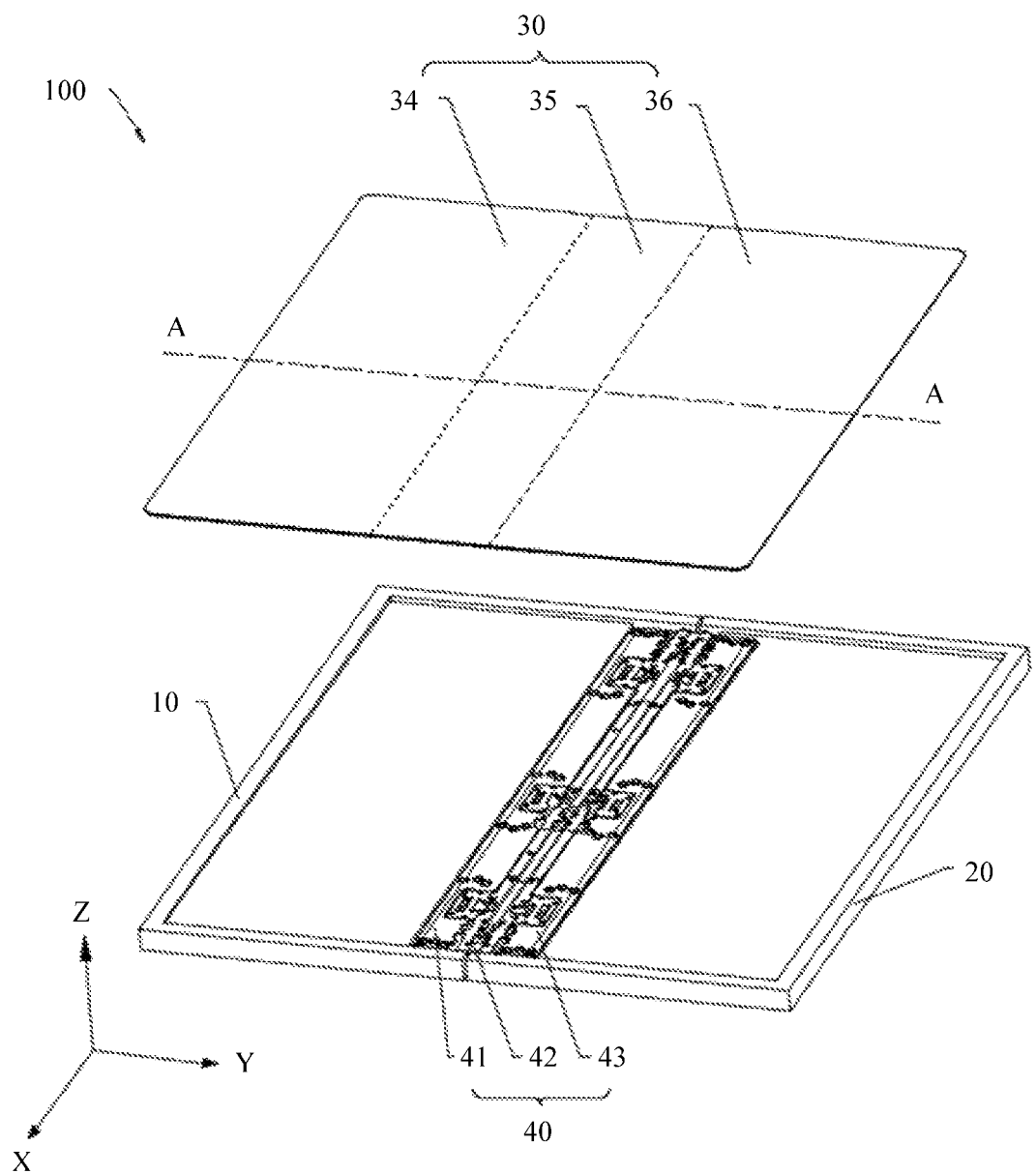
FIG. 4 is a schematic diagram of mounting a rotation apparatus of the electronic device shown in FIG. 3 in a first housing and a second housing.

It may be understood that there are a plurality of connection relationships between the first housing 10 and the second housing 20, for example, a rotatable connection, a sliding connection, and a detachable snap-fit connection. In this embodiment, that the first housing 10 is rotatably connected to the second housing 20 is used as an example for description. FIG. 3 is a partial schematic exploded view of the electronic device 100 shown in FIG. 1, and FIG. 4 is a schematic diagram of mounting a rotation apparatus of the electronic device shown in FIG. 3 in a first housing and a second housing. The electronic device 100 further includes a rotation apparatus 40. The rotation apparatus 40 is connected to the first housing 10 and the second housing 20. With the rotation apparatus 40, the first housing 10 and the second housing 20 can rotate relative to each other to be folded or unfolded. The rotation apparatus 40 is located between the first housing 10 and the second housing 20, and the rotation apparatus 40 and the second part 35 of the display module 30 face each other.

The rotation apparatus 40 may include a first support plate 41, a second support plate 42, and a third support plate 43. The second support plate 42 is located between the first support plate 41 and the third support plate 43. In addition, the first support plate 41, the second support plate 42, and the third support plate 43 face the second part 35 of the display module 30.

In addition, one side of the second support plate 42 is movably connected to the first support plate 41. The other side of the second support plate 42 is also movably connected to the third support plate 43. In other words, the first support plate 41, the second support plate 42, and the third support plate 43 can move relative to each other. In addition, a side that is of the first support plate 41 and that faces away from the second support plate 42 is movably connected to the first housing 10. A side that is of the third support plate 43 and that faces away from the second support plate 42 is movably connected to the second housing 20. In this case, the first housing 10 and the second housing 20 can rotate relative to each other through cooperation between the first support plate 41, the second support plate 42, and the third support plate 43, so as to be folded or unfolded.

It may be understood that when the electronic device 100 is unfolded, the first support plate 41, the second support plate 42, and the third support plate 43 jointly support the second part 35 of the display module 30.

Figure 5:
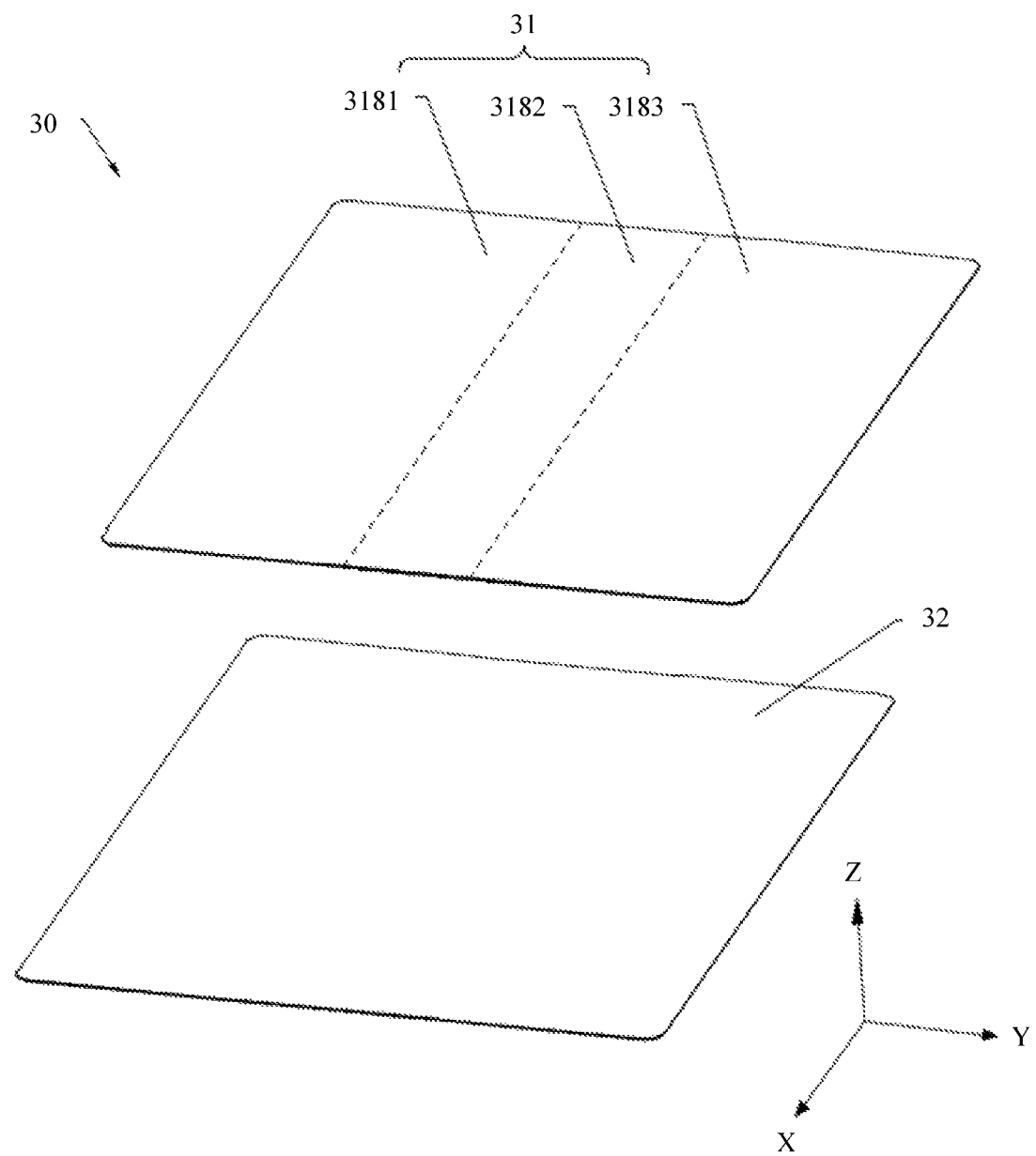
FIG. 5 is a schematic exploded view of a display module of the electronic device shown in FIG. 4.

FIG. 5 is a schematic exploded view of a display module of the electronic device shown in FIG. 4. The display module 30 includes a display screen 31 and a support member 32. The display screen 31 is configured to display an image, a video, and the like. The display screen 31 is a flexible display screen. For example, the flexible display screen 31 may be an organic light-emitting diode (organic light-emitting diode, OLED) display screen, an active-matrix organic light-emitting diode (active-matrix organic light-emitting diode, AMOLED) display screen, a mini organic light-emitting diode (mini organic light-emitting diode) display screen, a micro light-emitting diode (micro light-emitting diode) display screen, a micro organic light-emitting diode (micro organic light-emitting diode) display screen, or a quantum dot light emitting diode (quantum dot light emitting diodes, QLED) display screen.

Referring to FIG. 5, with reference to FIG. 4, the display screen 31 includes a first non-bending region 3181, a bending region 3182, and a second non-bending region 3183 that are successively connected. In other words, the bending region 3182 is connected between the first non-bending region 3181 and the second non-bending region 3183. The first non-bending region 3181 is a part of the first part 34 of the display module 30. The bending region 3182 is a part of the second part 35. The second non-bending region 3183 is a part of the third part 36.

Figure 6:
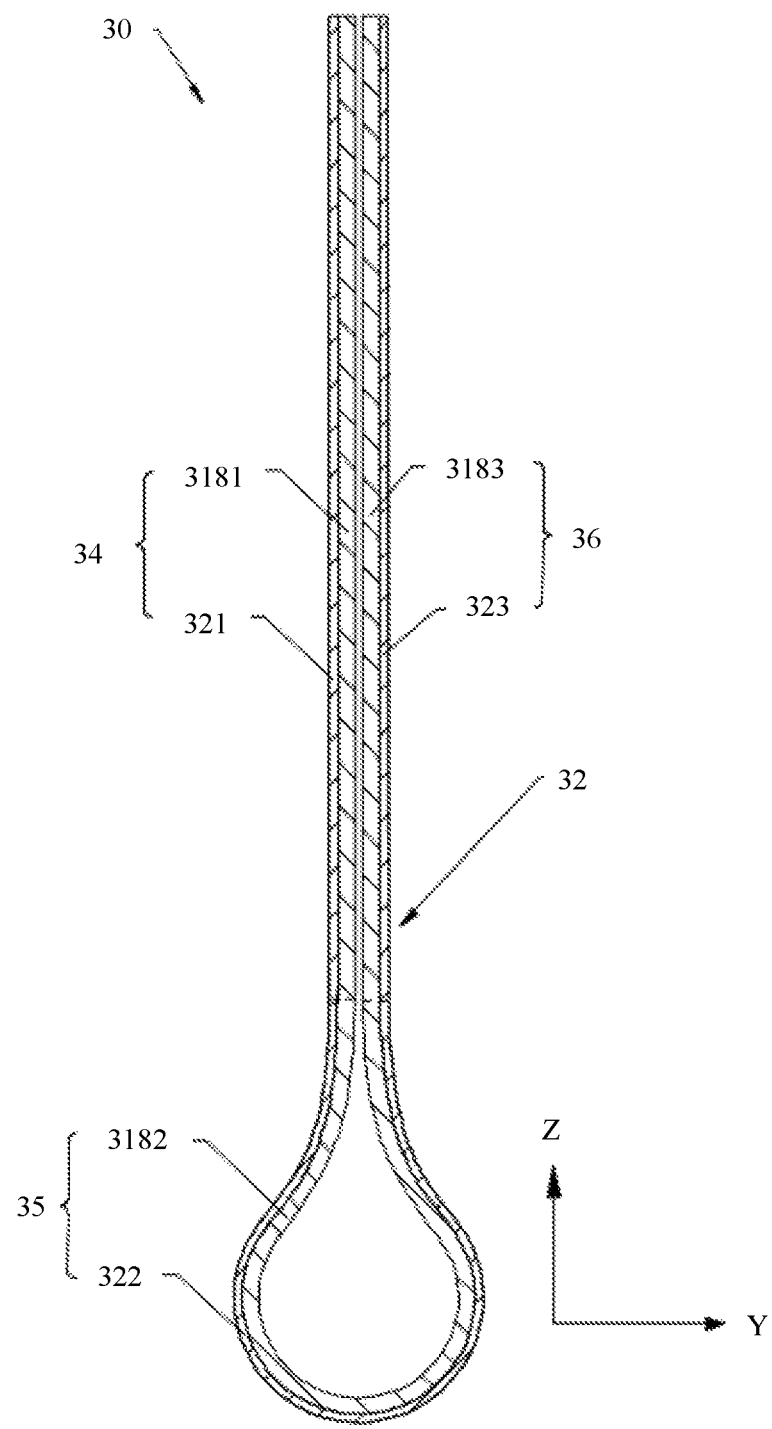
FIG. 6 is a schematic diagram of a display module of the electronic device shown in FIG. 4 in a folded state.

Referring to FIG. 5 and FIG. 6, FIG. 6 is a schematic diagram of a display module of the electronic device shown in FIG. 4 in a folded state. When the electronic device 100 is in an unfolded state, the first non-bending region 3181, the bending region 3182, and the second non-bending region 3183 are approximately at 180° (a slight deviation is allowed, for example, 165°, 177°, or 185°). When the electronic device 100 is in a folded state, the bending region 3182 is bent, and the first non-bending region 3181 faces the second non-bending region 3183. FIG. 6 shows that the bending region 3182 is approximately in a water droplet shape. In another implementation, the bending region 3182 may be in a semi-ring shape. This is not specifically limited in this application.

Figure 7A:
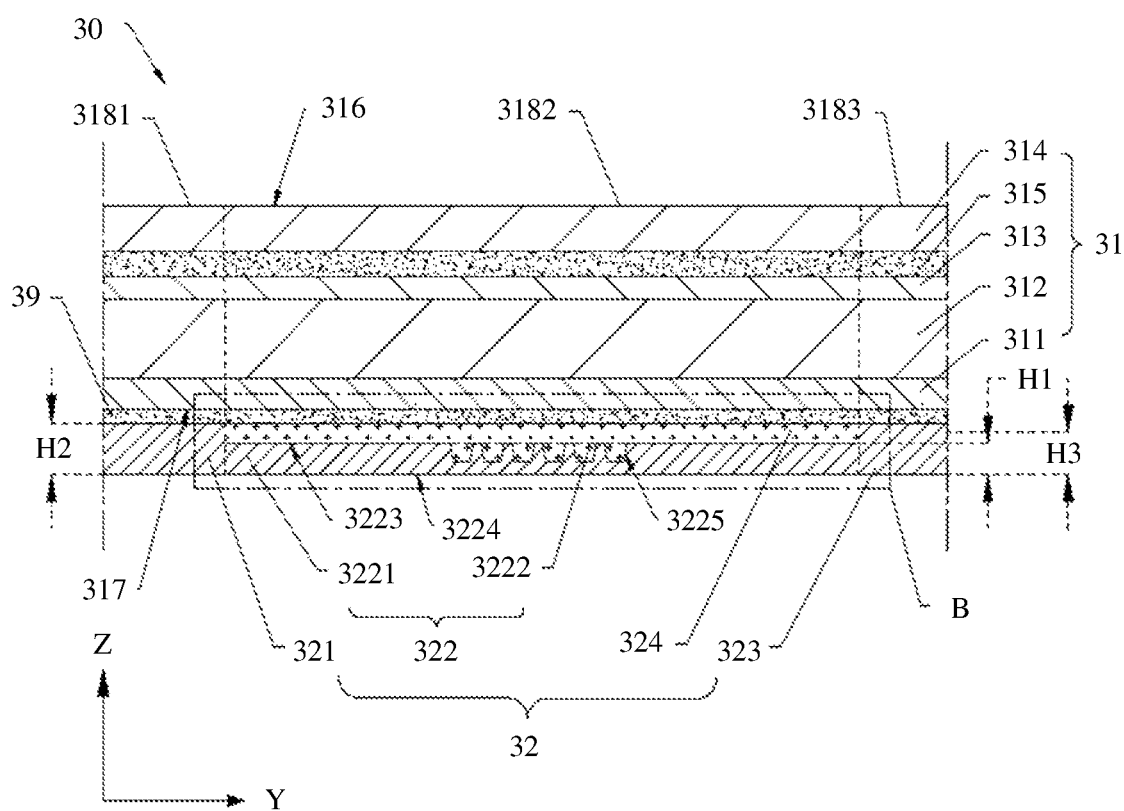
FIG. 7*a* is a partial schematic cross-sectional diagram of an implementation of a display module of the electronic device shown in FIG. 4 at a line A-A.

FIG. 7a is a partial schematic cross-sectional diagram of an implementation of a display module of the electronic device shown in FIG. 4 at a line A-A. The display screen 31 may include a back film 311, a display panel 312, a polarizer 313 (polarizer, POL), and a protection cover 314 that are successively stacked. In other words, the display panel 312 is located between the back film 311 and the polarizer 313, and the protection cover 314 is fastened on a side that is of the polarizer 313 and that faces away from the display panel 312. The back film 311 may be configured to support the display panel 312. The display panel 312 is configured to display an image, a video, and the like. The protection cover 314 is configured to protect the polarizer 313, the display panel 312, and the like.

In addition, the display screen 31 further includes optical clear adhesive 315. The optical clear adhesive 315 is fastened between the polarizer 313 and the protection cover 314. The optical clear adhesive 315 can enable display light emitted by the display panel 312 to propagate outside the electronic device 100, and can also improve flexibility of the display module 30.

In an implementation, the display screen 31 may be a touchscreen. The display screen 31 can be configured to generate a touch signal based on a touch action of a user. Specifically, when the user taps an icon of camera software on the display screen 31, the display screen 31 can generate a touch signal based on the tapping action of the user, and transmit the touch signal to a processor (not shown in the figure) of the electronic device 100. The processor receives the touch signal, and opens the camera software based on the touch signal. The processor may be mounted in the first housing 10 (referring to FIG. 4), or may be mounted in the second housing 20 (referring to FIG. 4).

The display panel 312 may have a touch function. In other words, the display panel 312 has a function of a touch panel. For example, the touch panel is embedded into a light emitting layer of the display panel 312 by using an on-cell technology. In another implementation, the display panel 312 may not have a touch function. In this case, the display screen 31 further includes a touch panel (not shown in the figure). The touch panel may be fastened between the protection cover 314 and the polarizer 313, or may be located between the polarizer 313 and the display panel 312.

Referring to FIG. 7a again, the display screen 31 includes an outer surface 316 and an inner surface 317 that are opposite to each other. The outer surface 316 of the display screen 31 is a surface that is of the display screen 31 and that faces the user when the user normally uses the electronic device 100, namely, a display side of the display screen 31. The inner surface 317 of the display screen 31 is a surface that is of the display screen 31 and that faces the interior of the electronic device 100 when the display module 30 is mounted in the first housing 10 and the second housing 20, namely, a non-display side of the display screen 31. The support member 32 of the display module 30 is fastened on the inner surface 317 of the display screen 31. In an implementation, the support member 32 may be fastened on the inner surface 317 of the display screen 31 by using optical clear adhesive (OCA), a PVB film, foam tape, a material obtained by combining the foregoing adhesive, or the like. FIG. 7a shows that optical clear adhesive 39 is disposed between the support member 32 and the inner surface 317 of the display screen 31.

In this application, the support member 32 has a plurality of disposition manners. The following specifically describes four disposition manners of the support member 32 with reference to related accompanying drawings. It may be understood that, in each embodiment, the structure of the support member 32 has good flexibility, strength, and hardness. In addition, the support member 32 also has good integrity and surface flatness.

In a first embodiment, referring to FIG. 7a again, the support member 32 includes a first metal plate member 321, a first connection plate member 322, a second metal plate member 323, and a first buffer member 324. The first connection plate member 322 is connected between the first metal plate member 321 and the second metal plate member 323. It may be understood that a direction in which the first metal plate member 321 faces the second metal plate member 323 is the length direction of the electronic device 100, namely, the positive direction of the Y-axis. A direction perpendicular to the direction in which the first metal plate member 321 faces the second metal plate member 323 is the X-axis direction.

The first buffer member 324 is located between the first metal plate member 321 and the second metal plate member 323, and the first buffer member 324 is fastened between the first connection plate member 322 and the display screen 31. In FIG. 7a, the first metal plate member 321, the first connection plate member 322, and the second metal plate member 323 are distinguished from each other by using a dashed line.

In addition, the first buffer member 324 is located between the first metal plate member 321 and the second metal plate member 323, and the first buffer member 324 is stacked on the first connection plate member 322. In this implementation, the first buffer member 324 is fastened between the first connection plate member 322 and the display screen 31. Specifically, the first buffer member 324 is fastened to the bending region 3182 by using the optical clear adhesive 39.

In addition, as shown in FIG. 6, the first metal plate member 321 faces the first non-bending region 3181. The first metal plate member 321 is a part of the first part 34 of the display module 30. Specifically, the first metal plate member 321 is fastened to the first bending region 3181 3181 by using the optical clear adhesive 39.

Both the first connection plate member 322 and the first buffer member 324 face the bending region 3182. The first connection plate member 322 and the first buffer member 324 each are a part of the second part 35.

The second metal plate member 323 faces the second non-bending region 3183. The second metal plate member 323 is a part of the third part 36. Both the first connection plate member 322 and the first buffer member 324 are capable of being bent. Specifically, the second metal plate member 323 is fastened to the second non-bending region 3183 by using the optical clear adhesive 39.

Referring to FIG. 6 and FIG. 7*a* again, when the electronic device 100 is in a folded state, the first connection plate member 322 and the first buffer member 324 are bent, and the first metal plate member 321 and the second metal plate member 323 face each other. FIG. 6 shows that the support member 32 is approximately in a water droplet shape. In another implementation, the support member 32 may be in a ring shape. This is not specifically limited in this application. When the electronic device 100 is in an unfolded state, the first metal plate member 321, the first connection plate member 322, the second metal plate member 323, and the first buffer member 324 are approximately at 180° (a slight deviation is allowed, for example, 165°, 177°, or 185°.

Materials of the first metal plate member 321 and the second metal plate member 323 are metal. For example, the first metal plate member 321 and the second metal plate member 323 may be but are not limited to copper, aluminum, beryllium copper, stainless steel, titanium alloy, or the like. In this case, the first metal plate member 321 and the second metal plate member 323 have good hardness and stiffness.

A material of the first buffer member 324 may be but is not limited to a polymer material. For example, the material of the first buffer member 324 may be another elastic material. In this case, the first buffer member 324 has good flexibility.

Referring to FIG. 7*a*, the first connection plate member 322 includes a metal part 3221 and organic material parts 3222. The metal part 3221 includes a first surface 3223 and a second surface 3224 that are opposite to each other. The first surface 3223 faces the display screen 31. The metal part 3221 is provided with a plurality of grooves 3225. Each groove 3225 is recessed in a direction from the first surface 3223 to the second surface 3224. In other words, an opening of the groove 3225 is located on the first surface 3223 and faces the display screen 31. The organic material parts 3222 are located in the plurality of grooves 3225, and are fixedly connected to the metal part 3221. In addition, the first buffer member 324 is stacked on the first surface 3223 of the metal part 3221. In other words, the first buffer member 324 is fixedly connected to the metal part 3221. In addition, the first buffer member 324 is fixedly connected to the organic material parts 3222. It may be understood that, in the Y-axis direction, a quantity of organic material parts 3222 is not limited to six shown in FIG. 7*a*.

A material of the metal part 3221 may be but is not limited to copper, aluminum, beryllium copper, stainless steel, titanium alloy, or the like. In this case, the metal part 3221 has good hardness and stiffness.

In addition, a material of the organic material part 3222 may be but is not limited to a polymer material. In this case, the organic material part 3222 has good flexibility.

In addition, in the Z direction, a height of the metal part 3221 is H1, a height of the first metal plate member 321 is H2, and a height of the second metal plate member 323 is H3. In this implementation, H1 is less than H2, and H1 is less than H3. Certainly, in another implementation, H1 may be equal to H2, and H1 may be equal to H3.

It may be understood that hardness of the metal part 3221 are greater than hardness of the organic material parts 3222. It may be understood that stiffness of the metal part 3221 are greater than stiffness of the organic material parts 3222. In this case, because the first connection plate member 322 has both the metal part 3221 and the organic material parts 3222, overall stiffness and hardness of the first connection plate member 322 are moderate. When the electronic device 100 is in an unfolded state, the first connection plate member 322 has sufficient stiffness and hardness to support the bending region 3182 of the display screen 31, to prevent the bending region 3182 of the display screen 31 from collapsing, namely, to ensure that the display screen 31 has good surface flatness. When the electronic device 100 is unfolded or folded, because the first connection plate member 322 has good flexibility, the first connection plate member 322 less affects bending of the display screen 31. In other words, when the electronic device 100 is folded or unfolded, the organic material parts 3222 can absorb stress generated during bending.

In addition, the first support plate 41, the second support plate 42, and the third support plate 43 of the rotation apparatus 40 are generally provided with a large quantity of grooves or through holes. The groove or the through hole may serve as avoidance space for a component or be used to tighten a fastener. In a solution in which the first connection plate member 322 is provided with grooves 3225 and no organic material part 3222 is not disposed in the grooves 3225, when the electronic device 100 is in an unfolded state, peripheral edges of the grooves or the through holes on the first support plate 41, the second support plate 42, and the third support plate 43 of the rotation apparatus 40 easily extrude the first connection plate member 322. Because stress on peripheral edges of the grooves 3225 of the first connection plate member 322 is concentrated, the peripheral edges of the grooves 3225 can extrude the optical clear adhesive 39 with large extrusion force, and the optical clear adhesive 39 protrudes. Consequently, a black spot, a bright line, or the like occurs on the display screen 31. However, in this implementation, the organic material parts 3222 are disposed in the grooves 3225 of the metal part 3221. Therefore, when the peripheral edges of the grooves or the through holes on the first support plate 41, the second support plate 42, and the third support plate 43 of the rotation apparatus 40 extrude the first connection plate member 322, the organic material parts 3222 may absorb partial extrusion force, to prevent the stress on the peripheral edges of the grooves 3225 from being excessively concentrated, namely, to prevent the optical clear adhesive 39 from protruding due to excessive extrusion. Therefore, a black spot, a bright line, or the like is prevented from occurring on the display screen 31.

In addition, when the peripheral edges of the grooves or the through holes on the first support plate 41, the second support plate 42, and the third support plate 43 extrude the first connection plate member 322, the first connection plate member 322 transfers extrusion force to the first buffer member 324. In this case, the first buffer member 324 may also absorb partial extrusion force to further prevent a black spot, a bright line, or the like from occurring on the display screen 31 due to excessive extrusion.

In addition, when the peripheral edges of the grooves or the through holes on the first support plate 41, the second support plate 42, and the third support plate 43 extrude the first connection plate member 322, if the first connection plate member 322 is broken and extrudes the display screen 31, the first buffer member 324 may also prevent the broken first connection plate member 322 from directly piercing or extruding the display screen 31. Therefore, a black spot, a bright line, or the like is prevented, to a large degree, from occurring on the display screen 31.

In addition, hardness and stiffness of the first metal plate member 321 and the second metal plate member 323 are large. In this case, when the electronic device 100 is folded or unfolded, the first metal plate member 321 has good hardness and stiffness to support the first non-bending region 3181 of the display screen 31, and the second metal plate member 323 has good hardness and stiffness to support the second non-bending region 3183 of the display screen 31. Therefore, the display screen 31 is prevented from collapsing, namely, it is ensured that the display module 30 has good surface flatness.

In addition, the first metal plate member 321, the first connection plate member 322, the second metal plate member 323, and the first buffer member 324 can form an integral component (the support member 32). In this case, a manner in which the support member 32 as the integral component is mounted on the display screen 31 is simple, namely, an assembly manner of the display module 30 can be simplified.

In an implementation, the first metal plate member 321, the metal part 3221, and the second metal plate member 323 are an integrally formed structure. In other words, the first metal plate member 321, the metal part 3221, and the second metal plate member 323 are an integral structure. In this case, firmness of a connection between the first metal plate member 321, the metal part 3221, and the second metal plate member 323 is better. In addition, there are fewer steps of forming the first metal plate member 321, the metal part 3221, and the second metal plate member 323. This can reduce input costs of the support member 32

Specifically, the first metal plate member 321, the metal part 3221 of the first connection plate member 322, and the second metal plate member 323 that are successively connected are formed on an integral plate member through CNC machining. In another implementation, the first metal plate member 321, the metal part 3221, and the second metal plate member 323 that are successively connected may be formed in a manner such as an injection molding technology or chemical corrosion.

In another implementation, the first metal plate member 321, the metal part 3221, and the second metal plate member 323 may be formed through welding or connected by using a snap-fit.

In an implementation, the materials of the first metal plate member 321, the metal part 3221, and the second metal plate member 323 are the same. In this case, the support member 32 has fewer material types. This can reduce a material preparation step of the support member 32, and reduce the input costs of the support member 42.

In an implementation, the first metal plate member 321, the metal part 3221, and the second metal plate member 323 are formed by using one step. It may be understood that one-step formation includes manners such as extrusion molding, injection molding, compression molding, and calendering molding. In this way, the support member 32 has fewer manufacturing steps. This can reduce the input costs of the support member 32.

In an implementation, the second surface 3224 is a complete and continuous surface. It may be understood that "a complete and continuous surface" means that the second surface 3224 is flat and is provided with no groove or through hole. In this case, a second connection plate member has good integrity. When the peripheral edges of the grooves or the through holes on the first support plate 41, the second support plate 42, and the third support plate extrude the first connection plate member 322, the first connection plate member 322 has sufficient strength to resist extrusion force. Therefore, the first connection plate 322 is prevented from being broken, and protrusion is prevented from occurring at a position due to concentrated stress.

Referring to FIG. 7a again, in the Z direction, namely, in a thickness direction of the display module 30, the height H1 of the metal part 3221 ranges from 0.015 millimeter to 0.3 millimeter. In this way, the first connection plate member 322 can have good flexibility while the hardness and the stiffness of the first connection plate member 322 are ensured. In other words, the hardness and the stiffness of the first connection plate member 322 are moderate.

Referring to FIG. 7a again, in the Z direction, the height H2 of the first metal plate member 321 and the height H3 of the second metal plate member 323 range from 0.1 millimeter to 0.5 millimeter. In this way, the first metal plate member 321 and the second metal plate member 323 have sufficient hardness and stiffness. Therefore, when the electronic device 100 is unfolded or folded, the first metal plate member 321 and the second metal plate member 323 can effectively support the display screen 31. In addition, the first metal plate member 321 and the second metal plate member 323 are thin. Therefore, the first metal plate member 321 and the second metal plate member 323 do not increase a thickness of the display module 30 to a large degree.

Figure 7B:
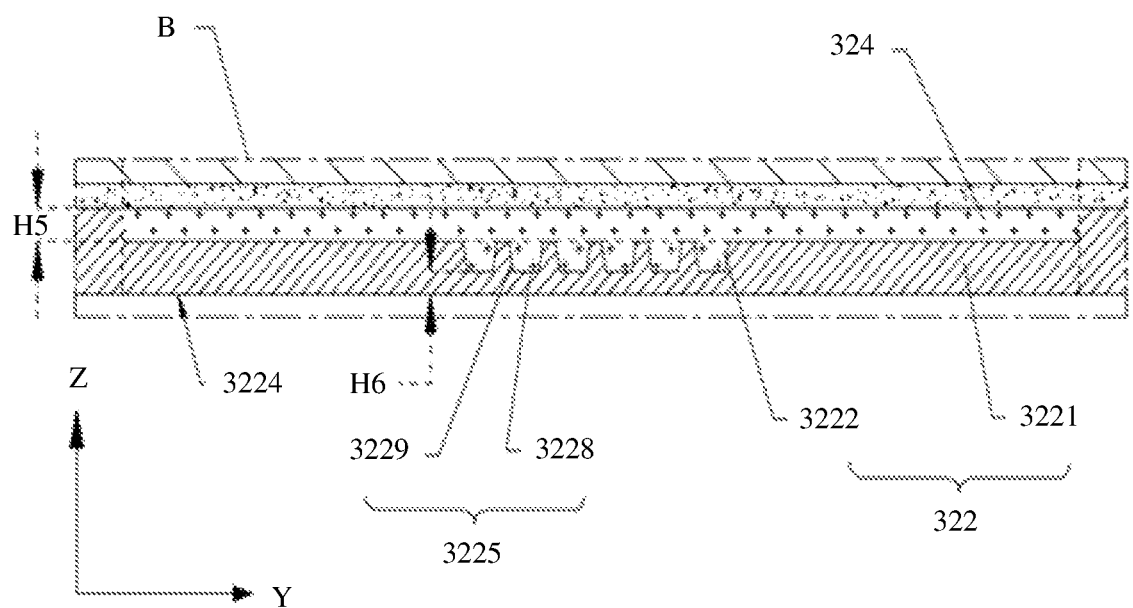
FIG. 7*b* is a schematic diagram of enlarging the electronic device shown in FIG. 7*a* at a position B.

FIG. 7b is a schematic diagram of enlarging the electronic device shown in FIG. 7a at a position B. In the Z direction, a height H5 of the first buffer member 324 ranges from 0.01 millimeter to 0.2 millimeter. In this way, when the peripheral edges of the grooves or the through holes on the first support plate 41, the second support plate 42, and the third support plate 43 extrude the first connection plate member 322, the first connection plate member 322 transfers extrusion force to the first buffer member 324. In this case, the first buffer member 324 has sufficient flexibility to absorb extrusion force to further prevent a black spot, a bright line, or the like from occurring on the display screen 31 due to excessive extrusion.

In addition, when the peripheral edges of the grooves or the through holes on the first support plate 41, the second support plate 42, and the third support plate 43 extrude the first connection plate member 322, if the first connection plate member 322 is broken and extrudes the display screen 31, the first buffer member 324 has sufficient thickness to prevent the broken first connection plate member 322 from directly piercing or extruding the display screen 31. Therefore, a black spot, a bright line, or the like is prevented, to a large degree, from occurring on the display screen 31.

Referring to FIG. 7b again, the groove 3225 includes a side wall 3229 and a bottom wall 3228. The bottom wall 3228 is connected to the side wall 3229. In the Z direction, a thickness H6 from the bottom wall 3228 of the groove 3225 to a surface that is of the metal part 3221 and that faces away from the display screen 31 ranges from 0.01 millimeter to 0.05 millimeter. In other words, the thickness H6 from the bottom wall 3228 of the groove 3225 to the second surface 3224 ranges from 0.01 millimeter to 0.05 millimeter. In this way, the metal pall 3221 can have good flexibility while the hardness and the stiffness of the metal part 3221 are ensured. In other words, the hardness and the stiffness of the first connection plate member 322 are moderate. Therefore, when the electronic device 100 is in an unfolded state, the first connection plate member 322 has sufficient stiffness and hardness to support the bending region 3182 of the display screen 31, to prevent the bending region 3182 of the display screen 31 from collapsing. When the electronic device 100 is unfolded or folded, because the first connection plate member 322 has good flexibility, the first connection plate member 322 less affects bending of the display screen 31.

Figure 8:
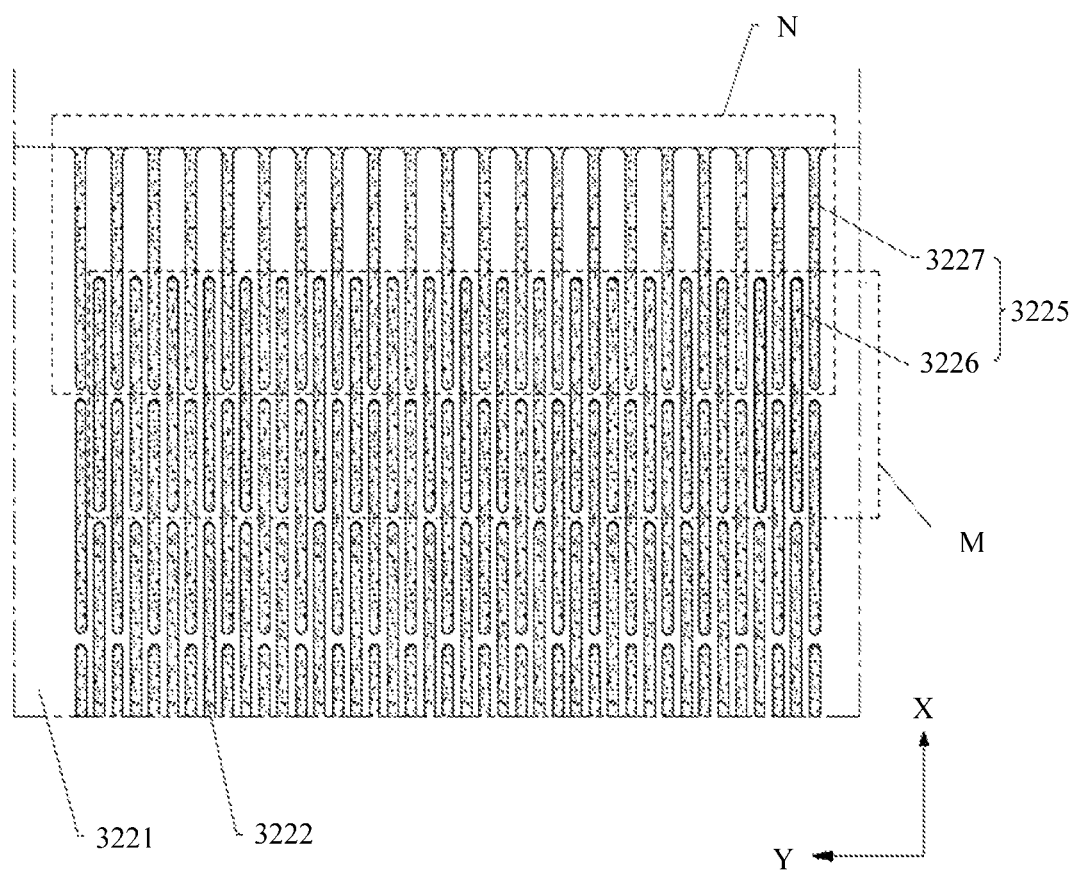
FIG. 8 is a partial schematic diagram of a structure of a first connection plate member of the display module shown in FIG. 7*a*.

FIG. 8 is a partial schematic structural diagram of a first connection plate member of the display module shown in FIG. 7a. The metal part 3221 is provided with a plurality of first groove groups M and two second groove groups N. The two second groove groups N are respectively located on two sides of the plurality of first groove groups M. FIG. 8 shows one second groove group N in a positive direction of the X-axis. It may be understood that one second groove group N is also correspondingly disposed in a negative direction of the X-axis. Certainly, in another implementation, the metal part 3221 may not be provided with the two second groove groups N.

The plurality of first groove groups M are arranged in the X-axis direction. It may be understood that, in the X-axis direction, every two first groove groups M may be disposed in parallel with each other, but a slight deviation is allowed, for example, 155°, 166°, or 177°. In addition, each first groove group M includes a plurality of first grooves 3226. The plurality of first grooves 3226 are arranged at intervals in the Y-axis direction. It may be understood that, in the Y-axis direction, every two first grooves 3226 may be disposed in parallel with each other, but a slight deviation is allowed, for example, 155°, 166°, or 177°. In addition, FIG. 8 shows that a plurality of first grooves 3226 in two adjacent first groove groups M alternate with each other. In other words, there is an overlapping part between the first grooves 3226 in the two adjacent first groove groups M. In another implementation, the plurality of first grooves 3226 in the first groove groups M may be spaced from each other.

Each second groove group N includes a plurality of second grooves 3227. A plurality of second grooves 3227 in a same second groove group N are arranged at intervals in the Y-axis direction. It may be understood that, in the Y-axis direction, every two second grooves 3227 may be disposed in parallel with each other, but a slight deviation is allowed, for example, 155°, 166°, or 177°. In addition, a plurality of second grooves 3227 in a same second groove group N penetrate through a side surface of the metal part 3221. FIG. 8 shows that a plurality of second grooves 3227 in the second groove group N in the positive direction of the X-axis penetrate through the side surface of the metal part 3221.

In addition, FIG. 8 shows that at least a part of each second groove 3227 is located between two first grooves 3226. In other words, there is an overlapping part between the second groove 3227 and the first groove 3226. In another implementation, each second groove 3227 may be spaced from the first groove 3226.

In this implementation, the first groove groups M and the two second groove groups N are disposed on the metal part 3221, so that overall flexibility of the first connection plate member 322 can be improved to ensure that the display module 30 has good flexibility. In addition, when the organic material parts 3222 are disposed in the first grooves 3226 and the second grooves 3227, the overall flexibility of the first connection plate member 322 can be further improved. In this case, when the electronic device 100 is folded or unfolded, the organic material parts 3222 can effectively absorb bending force, so that folding and unfolding of the electronic device 100 are not affected.

In addition, the plurality of second grooves 3227 penetrate through a side surface of the first connection plate member 322, to avoid partial concentrated stress at a side part of the first connection plate member 322. In this case, when the electronic device 100 is unfolded or folded, the second grooves 3227 can absorb the stress generated in a process of bending the display module 30, namely, the display module 30 is prevented from being not easily bent due to excessively large stress on the side surface of the first connection plate member 322.

Figure 9A:
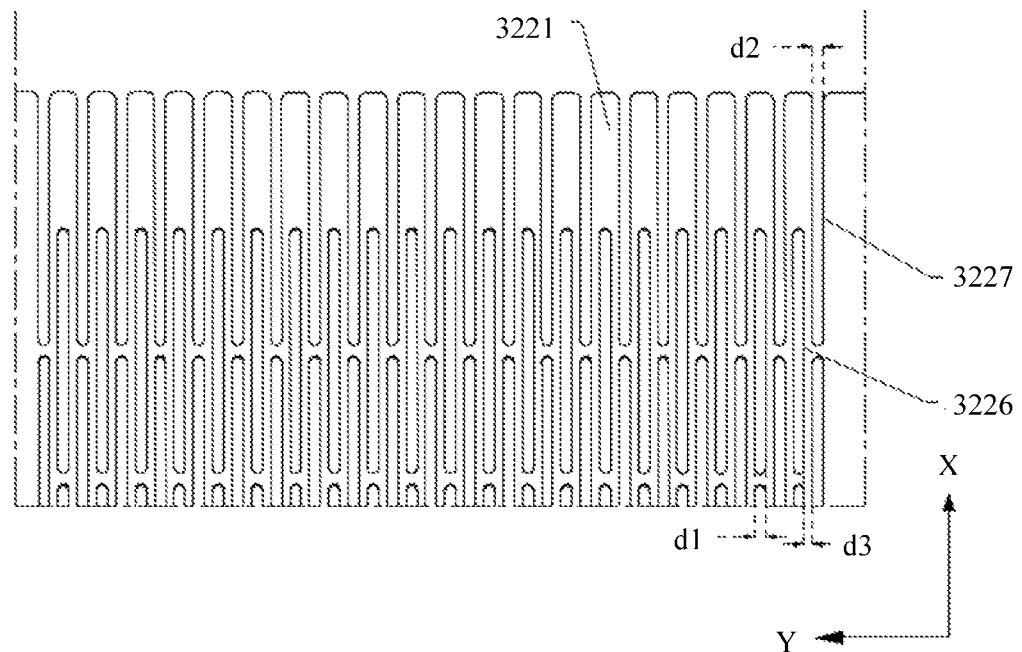
FIG. 9a is a partial schematic diagram of a structure of the first connection plate member shown in FIG. 8 that includes no organic material part.

With reference to FIG. 8, FIG. 9a is a partial schematic structural diagram of the first connection plate member shown in FIG. 8 that includes no organic material part. The first groove 3226 is a strip hole. An extension direction of the first groove 3226 is parallel to the X-axis direction. A width d1 of the first groove 3226 in the Y-axis direction ranges from 0.15 millimeter to 3 millimeters. For example, d1 is equal to 0.15 millimeter, 0.26 millimeter, 1 millimeter, 2 millimeters, or 3 millimeters. In another implementation, the extension direction of the first groove 3226 may be parallel to the Y-axis direction.

In this implementation, when the extension direction of the first groove 3226 is parallel to the X-axis direction, and the width d1 of the first groove 3226 in the Y-axis direction ranges from 0.15 millimeter to 3 millimeters, an area that is of a hollow-out region formed by the metal part 3221 and that is on an X-Y plane is large. In this case, an area that is of the organic material part 3222 disposed in the first groove 3226 and that is on the X-Y plane is also large. Therefore, when the electronic device 100 is unfolded or folded, the organic material parts 3222 can absorb the stress generated in the bending process, namely, the display module 30 is prevented from being not easily bent due to excessively large stress on the metal part 3221. Therefore, a bending effect of the display module 30 is improved.

It may be understood that, to ensure that the support member 32 has large hardness and stiffness, the grooves disposed on the support member are generally small. In this implementation, the organic material parts 3222 are disposed in the first grooves 3226, and the organic material parts 3222 may improve the hardness and the stiffness of the first connection plate member 322 to a degree. In this case, a size of the first groove 3226 disposed on the metal part 3221 is large (specifically, on the Y-axis, a maximum value of the width d1 of the first groove 3226 may be up to 3 millimeters). In addition, in a process of manufacturing the support member 32, a quantity of manufactured first grooves 3226 may be reduced to a large degree. Therefore, the input costs of the support member 32 are reduced.

In an implementation, the second groove 3227 is a strip hole. An extension direction of the second groove 3227 is parallel to the X direction. A width d2 of the second groove 3227 in the Y-axis direction ranges from 0.15 millimeter to 3 millimeters. For example, d2 is equal to 0.15 millimeter, 0.26 millimeter, 1 millimeter, 2 millimeters, or 3 millimeters. In another implementation, the extension direction of the second groove 3227 may be parallel to the Y direction.

In this implementation, when the extension direction of the second groove 3227 is parallel to the X-axis direction, and the width d2 of the second groove 3227 on the Y-axis ranges from 0.15 millimeter to 3 millimeters, the area that is of the hollow-out region formed by the metal part 3221 and that is on the X-Y plane is large. In this case, an area that is of the organic material part 3222 disposed in the second groove 3227 and that is on the X-Y plane is also large. Therefore, when the electronic device 100 is unfolded or folded, the organic material parts 3222 can absorb the stress generated in the process of bending the display module 30, namely, the display module 30 is prevented from being not easily bent due to excessively large stress on the metal part 3221. Therefore, a bending effect of the display module 30 is improved.

It may be understood that, to ensure that the support member 32 has large hardness and stiffness, the grooves 3225 disposed on the support member are generally small. In this implementation, a size of the second groove 3227 disposed on the metal part 3221 may be large (specifically, on the Y-axis, a maximum value of the width of the second groove 3227 may be up to 3 millimeters). In this case, in the process of manufacturing the support member 32, a quantity of manufactured second grooves 3227 may be reduced to a large degree. Therefore, the input costs of the support member 32 are reduced.

In an implementation, in the Y-axis direction, a distance d3 between two adjacent first grooves 3226 in a same first groove group M ranges from 0.05 millimeter to 0.8 millimeter. For example, d3 is equal to 0.05 millimeter, 0.1 millimeter, 0.2 millimeter, 0.5 millimeter, 0.6 millimeter, or 0.8 millimeter.

It may be understood that, to ensure that the support member 32 has large flexibility, a distance between two adjacent grooves 3225 on the support member 32 is generally small, namely, a size of the metal part 3221 between the grooves 3225 is small. In this implementation, the distance d3 between the two first grooves 3226 may be large (for example, on the Y-axis, a maximum value of the distance d3 between the two first grooves 3226 may be up to 0.8 millimeter). In this case, the organic material parts 3222 are disposed in the grooves 3225. Therefore, it can be ensured that the support member 32 has good hardness and stiffness, and flexibility of the support member 32 can be improved to a degree.

Figure 9B:
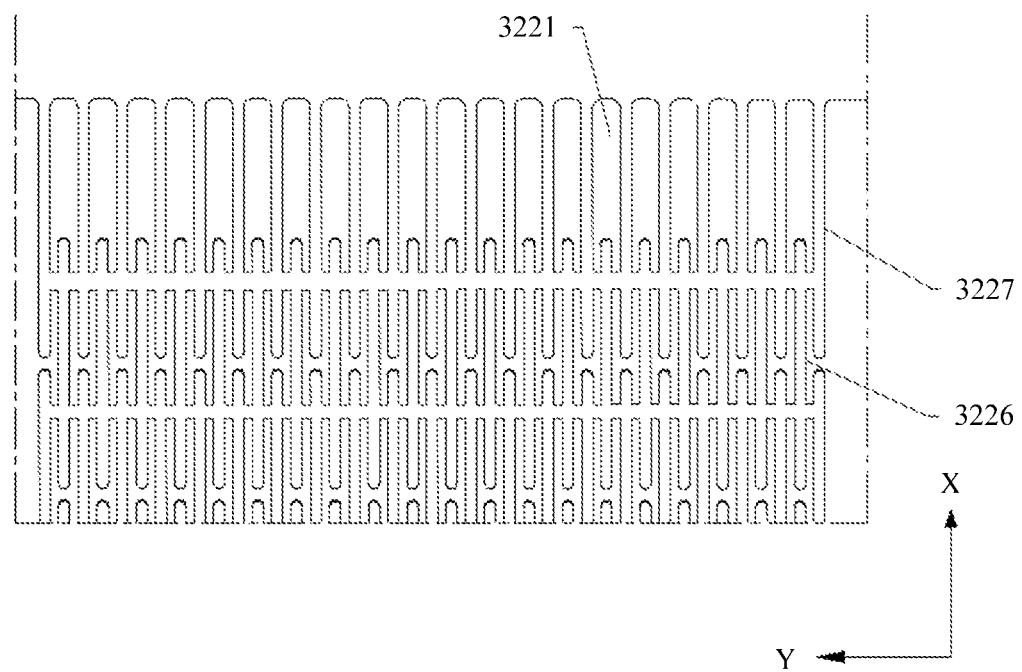
FIG. 9b is a partial schematic diagram of a structure of another implementation of the first connection plate member shown in FIG. 8 that includes no organic material part.

FIG. 9b is a partial schematic structural diagram of another implementation of the first connection plate member shown in FIG. 8 that includes no organic material part. The plurality of first grooves 3226 and the plurality of second grooves 3227 communicate with each other. In this case, the plurality of first grooves 3226 and the plurality of second grooves 3227 form a mesh structure. In this case, the first connection plate member 322 has better flexibility, namely, the first connection plate member 322 less affects bending of the display screen 31.

It may be understood that the organic material part 3222 disposed in the groove 3225 has a plurality of formation manners.

In a first implementation, referring to FIG. 7a to FIG. 9a again, the organic material parts 3222 are connected to the metal part 3221 through injection molding. In other words, the organic material parts 3222 are formed on the metal part 3221 by using the injection molding technology, and are connected to the metal part 3221.

Specifically, a polymer material is injected into the groove 3225 of the metal part 3221 by using the injection molding technology. After the polymer material cools and cures, the polymer material form the organic material part 3222.

It may be understood that the organic material parts 3222 are connected to the metal part 3221 through injection molding, so that firmness of a connection between the organic material parts 3222 and the metal part 3221 can be improved, and the first connection plate member 322 formed by the organic material parts 3222 and the metal part 3221 has good integrity.

In an implementation, the material of the organic material part 3222 includes at least one of a polyurethane (polyurethane, PU) material, thermoplastic polyurethane (thermoplastic polyurethane, TPU), a thermoplastic elastomer (thermoplastic elastomer, TPE), a thermo-plastic-rubber material (thermo-plastic-rubber material, TPR), a thermoplastic vulcanizate (thermoplastic vulcanizate, TPV), and an ethylene-vinyl acetate copolymer (ethylene-vinyl acetate copolymer, EVA). The material of the organic material part 3222 further includes P4U. In this implementation, the material of the organic material part 3222 includes the P4U and the PU. In another implementation, the material of the organic material part 3222 may include the P4U, the TPR, and the TPV.

It may be understood that when the electronic device 100 is normally used (namely, the electronic device 100 is not collided or impacted), the P4U and the PU can maintain soft, namely, an elastic modulus of the first connection plate member 322 is small. In this case, when the electronic device is unfolded or folded, the first connection plate member 322 less affects folding or unfolding of the display screen 31, namely, the P4U and the PU can ensure that the first connection plate member 322 has a good bending property.

In addition, when the electronic device 100 is collided or impacted, the P4U and the PU are severely collided or impacted by the metal part 3221. In this case, molecules in the P4U and the PU can immediately lock each other, and quickly shrink and harden. In this case, the elastic modulus of the first connection plate member 322 is significantly increased to prevent the display screen 31 from being deformed due to extrusion by the first connection plate member 322. When impact force or extrusion force exerted on the P4U and the PU disappears, the P4U and the PU can quickly return to soft, namely, the P4U and the PU change from being hard to being soft. Therefore, it is ensured that the display module 30 can continue to be bent or unfolded.

In an implementation, the first buffer member 324 and the organic material parts 3222 are an integrally formed structure. In this case, the first buffer member 324 and the organic material parts 3222 have good integrity, and firmness of a connection between the first buffer member 324 and the organic material parts 3222 is also good.

In an implementation, the materials of the first buffer member 324 and the organic material part 3222 are the same. In other words, the material of the first buffer member 324 includes P4U. The material of the first buffer member 324 further includes at least one of PU, TPU, TPE, TPR, TPV, and EVA. In this case, the support member 32 has fewer material types. This can reduce the material preparation step of the support member 32, and reduce the input costs of the support member 42.

In an implementation, the first buffer member 324 and the organic material parts 3222 are formed by using one step. Specifically, when an uncured polymer material is injected into the groove 3225, the uncured polymer material overflows the groove 3225, and cures between the first metal plate member 321 and the second metal plate member 323 to form the first buffer member 324.

In this implementation, the first buffer member 324 and the organic material parts 3222 are formed by using one step. In this way, the support member 32 has fewer manufacturing technology steps. This can reduce the input costs of the support member 32.

In a second implementation, the organic material parts 3222 are connected to the metal part 3221 through ultraviolet curing and thermal curing. Specifically, the organic material part 3222 includes ultraviolet-cured adhesive or thermal-cured adhesive.

In an implementation, the organic material part 3222 includes the ultraviolet-cured adhesive. Specifically, uncured ultraviolet-cured adhesive is filled in the groove 3225. The uncured ultraviolet-cured adhesive is irradiated by using ultraviolet light. With the ultraviolet light, the uncured ultraviolet-cured adhesive cures to form the organic material part 3222.

In this implementation, the organic material parts 3222 are connected to the metal part 3221 through ultraviolet curing, so that firmness of a connection between the organic material parts 3222 and the metal part 3221 can be improved, and the first connection plate member 322 formed by the organic material parts 3222 and the metal part 3221 has good integrity. In addition, a formation manner of the organic material part 3222 is simple and easy to operate.

In an implementation, the first buffer member 324 and the organic material parts 3222 are an integrally formed structure. In this case, the first buffer member 324 and the organic material parts 3222 have good integrity, and firmness of a connection between the first buffer member 324 and the organic material parts 3222 is also good.

In an implementation, the materials of the first buffer member 324 and the organic material part 3222 are the same. In other words, the first buffer member 324 includes the ultraviolet-cured adhesive. In this case, the material preparation step of the support member 32 can be reduced, and the input costs of the support member 42 can be reduced.

In an implementation, the first buffer member 324 and the organic material parts 3222 are formed by using one step. Specifically, when uncured ultraviolet-cured adhesive is filled in the groove 3225, the uncured ultraviolet-cured adhesive overflows the groove 3225. In this case, the uncured ultraviolet-cured adhesive in the groove 3225 and uncured ultraviolet-cured adhesive between the first metal plate member 321 and the second metal plate member 323 are simultaneously irradiated by using ultraviolet light. The uncured ultraviolet-cured adhesive in the groove 3225 cures to form the organic material part 3222. The uncured ultraviolet-cured adhesive between the first metal plate member 321 and the second metal plate member 323 cures to form the first buffer member 324.

In this implementation, the first buffer member 324 and the organic material parts 3222 are formed by using one step. In this way, the support member 32 has fewer manufacturing technology steps. This can reduce the input costs of the support member 32.

In an implementation, the organic material part 3222 includes the thermal-cured adhesive.

Specifically, uncured thermal-cured adhesive is filled in the groove 3225. The thermal-cured adhesive may be but is not limited to glue. In this case, the glue may naturally cure at a normal temperature to form the organic material part 3222.

In an implementation, the first buffer member 324 and the organic material parts 3222 are an integrally formed structure. In this case, the first buffer member 324 and the organic material parts 3222 have good integrity, and firmness of a connection between the first buffer member 324 and the organic material parts 3222 is also good.

In an implementation, the materials of the first buffer member 324 and the organic material part 3222 are the same. In other words, the first buffer member 324 includes the thermal-cured adhesive. In this case, the support member 32 has fewer material types. This can reduce the material preparation step of the support member 32, and reduce the input costs of the support member 42.

In an implementation, the first buffer member 324 and the organic material parts 3222 are formed by using one step.

Specifically, uncured thermal-cured adhesive is filled in the groove 3225, and the uncured thermal-cured adhesive overflows the groove 3225, and flows between the first metal plate member 321 and the second metal plate member 323. The uncured thermal-cured adhesive in the groove 3225 cures to form the organic material part 3222. The uncured thermal-cured adhesive between the first metal plate member 321 and the second metal plate member 323 cures to form the first buffer member 324.

In this implementation, the first buffer member 324 and the organic material parts 3222 are formed by using one step. In this way, the support member 32 has fewer manufacturing technology steps. This can reduce the input costs of the support member 32.

The foregoing specifically describes the formation manner of the organic material part 3222. The following further specifically describes the support member 32 having another structure.

Figure 10:
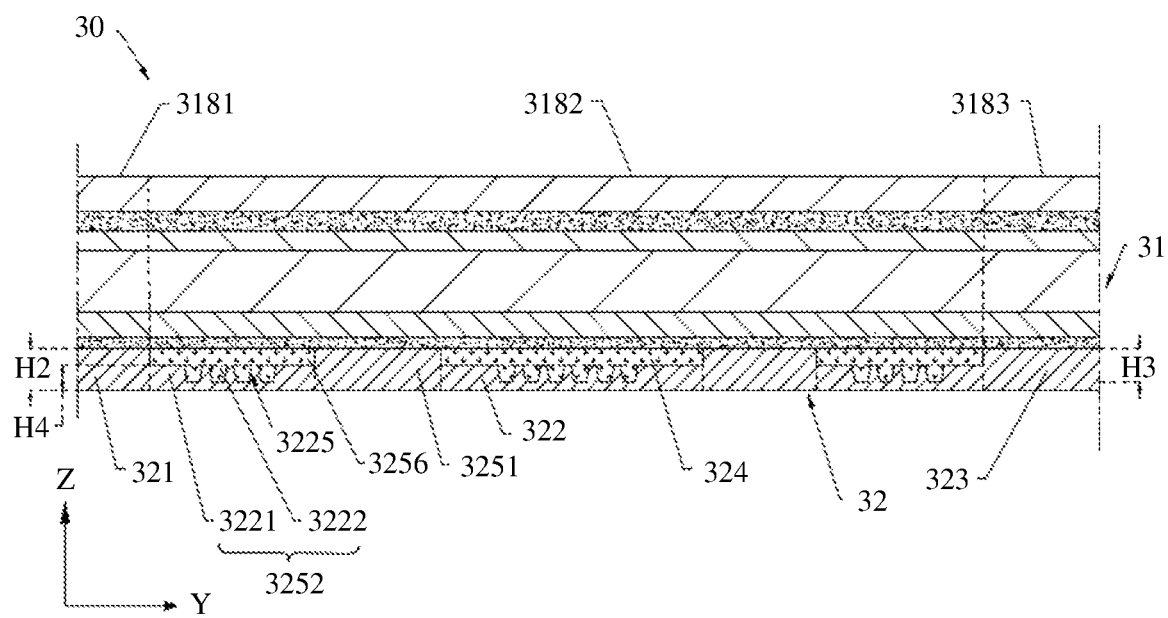
FIG. 10 is a partial schematic cross-sectional diagram of another implementation of a display module of the electronic device shown in FIG. 4 at a line A-A.

FIG. 10 is a partial schematic cross-sectional diagram of another implementation of a display module of the electronic device shown in FIG. 4 at a line A-A. The support member 32 further includes a third buffer member 3256, and a third metal plate member 3251 and a second connection plate member 3252 that face the bending region 3182 of the display screen 31. In addition, the first metal plate member 321, the second connection plate member 3252, the third metal plate member 3251, the first connection plate member 322, and the second metal plate member 323 are successively connected.

In the Z direction, a height H4 of the second connection plate member 3252 is less than the height H2 of the first metal plate member 321 and the height H3 of the second metal plate member 323. In another implementation, in the Z direction, the height H4 of the second connection plate member 3252 may be equal to the height H2 of the first metal plate member 321 and the height H3 of the second metal plate member 323. In addition, the second connection plate member 3252 is provided with grooves 3225. The second connection plate member 3252 includes a metal part 3221 and organic material parts 3222 located in the grooves 3225. The organic material parts 3222 are fixedly connected to the metal part 3221.

In addition, the third buffer member 3256 is located between the first metal plate member 321 and the third metal plate member 3251, and is stacked on the second connection plate member 3252. In an implementation, the third buffer member 3256 is fastened between the second connection plate member 3252 and the bending region 3182 of the display screen 31.

It may be understood that for a disposition manner of the groove 3225 in this implementation, refer to the disposition manner of the groove 3225 of the first connection plate member 322 in the foregoing implementations. Details are not described herein again. For a material and a disposition manner of the metal part 3221 in this implementation, refer to the material and the disposition manner of the metal part 3221 of the first connection plate member 322 in the foregoing implementations. Details are not described herein again. For a material and a disposition manner of the organic material part 3222 in this implementation, refer to the material and the disposition manner of the organic material part 3222 of the first connection plate member 322 in the foregoing implementations. Details are not described herein again.

In this implementation, because the second connection plate member 3252 has both the metal part 3221 and the organic material parts 3222, overall hardness and stiffness of the second connection plate member 3252 are moderate. In addition, the second connection plate member 3252 is stacked with the third buffer member 3256. In this case, flexibility of a partial region of the support member 32 may be improved through cooperation between the second connection plate member 3252 and the third buffer member 3256. In this case, a quantity of regions with good flexibility on the support member 32 may be increased. Therefore, when the support member 32 is fastened to the display screen 31, the second connection plate member 3252 may also be fastened to a region with a large bending angle in the bending region 3182 of the display screen 31, to ensure that the bending region of the display screen 31 has a good bending effect.

In another implementation, the opening of the groove 3225 may face away from the display screen 31. In other words, the third buffer member 3256 is fastened on a surface that is of the second connection plate member 3252 and that is away from the display screen 31. Alternatively, in another embodiment, the support member 32 may not include the third buffer member 3256.

In another implementation, the support member 32 may further include a fourth metal plate member, a fifth metal plate member, . . . , and an $S^{th}$ metal plate member. S is an integer greater than or equal to 6. In addition, the support member 32 may further include a third connection plate member, a fourth connection plate member, . . . , and a $P^{th}$ connection plate member. P is an integer greater than or equal to 5. The $P^{th}$ connection plate is connected between two metal plate members. The $P^{th}$ connection plate member is provided with grooves 3225. The $P^{th}$ connection plate member includes a metal part 3221 and organic material parts 3222 located in the grooves 3225. The organic material parts 3222 are fixedly connected to the metal part 3221.

The foregoing specifically describes the first embodiment (the first surface 3223 faces the display screen 31) of the display module 30. The following specifically describes a second embodiment (the first surface 3223 faces away from the display screen 31) by using related accompanying drawings.

In the second embodiment, same content as that in the first embodiment is not described again. In other words, most content of the first embodiment may be directly applied to the second embodiment.

Figure 11:
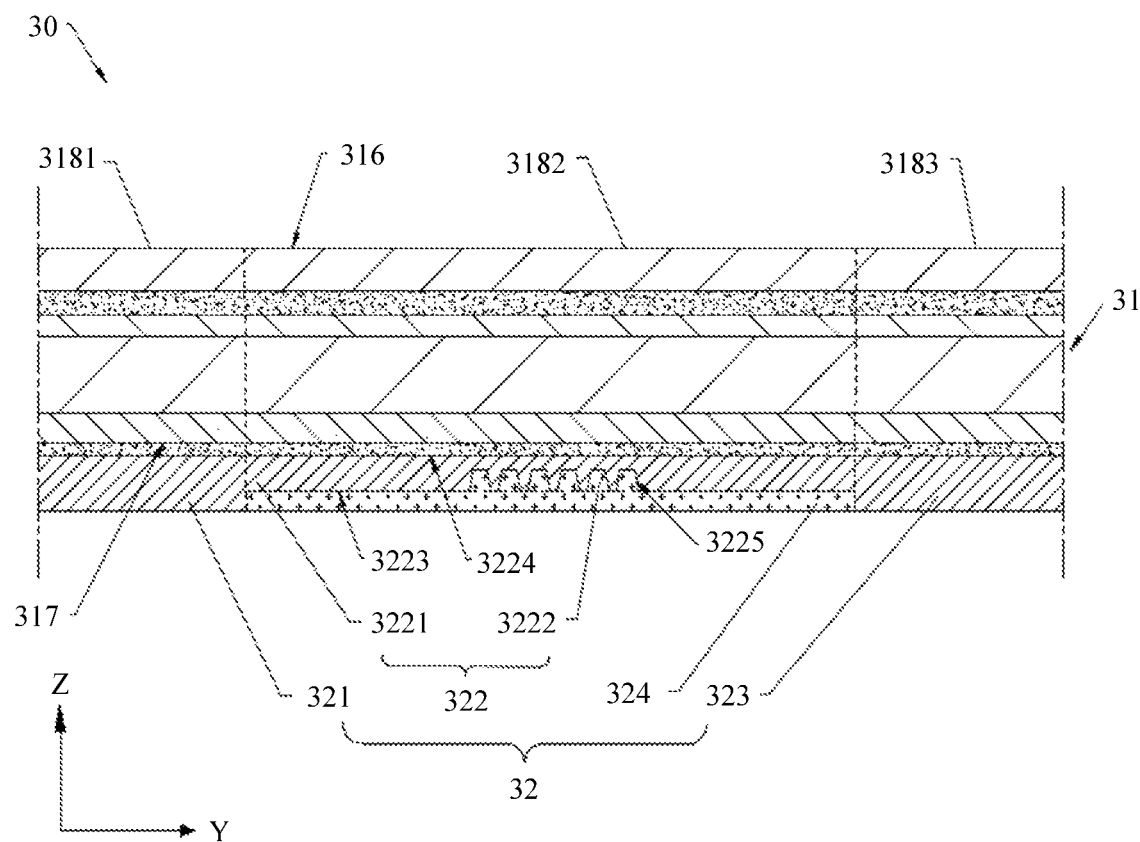
FIG. 11 is a partial schematic cross-sectional diagram of still another implementation of a display module of the electronic device shown in FIG. 4 at a line A-A.

FIG. 11 is a partial schematic cross-sectional diagram of still another implementation of a display module of the electronic device shown in FIG. 4 at a line A-A. The first surface 3223 faces away from the display screen 31. In other words, the opening of the groove 3225 faces away from the display screen 31. In this case, the first buffer member 324 is fastened on a surface that is of the first connection plate member 322 and that faces away from the display screen 31. For a material and a formation manner of the first buffer member 324 in this implementation, refer to the material and the formation manner of the first buffer member 324 in the first embodiment. Details are not described herein again.

It may be understood that, after the first connection plate member 322 cooperates with the first buffer member 324, overall stiffness and hardness of the support member 32 facing the bending region 3182 are moderate. In this case, when the electronic device 100 is in an unfolded state, the support member 32 has sufficient stiffness and hardness to support the bending region of the display screen 31, to prevent the bending region of the display screen 31 from collapsing, namely, to ensure that the display module 30 has good surface flatness.

In addition, the first buffer member 324 is disposed on the surface that is of the first connection plate member 322 and that faces away from the display screen 31, to further improve flexibility of the support member 32 facing the bending region 3182 of the display screen 31. When the electronic device 100 is unfolded or folded, the support member 32 facing the bending region 3182 has good flexibility, so that bending of the display screen 31 is prevented from being affected due to large hardness and stiffness of the support member 32. In other words, when the electronic device 100 is folded or unfolded, the first buffer member 324 can absorb the stress generated during bending.

In addition, the first buffer member 324 is disposed on the surface that is of the first connection plate member 322 and that faces away from the display screen 31. Therefore, when the electronic device 100 is in an unfolded state, the peripheral edges of the grooves or the through holes on the first support plate 41, the second support plate 42, and the third support plate 43 of the rotation apparatus 40 extrude the first buffer member 324. In this way, the first buffer member 324 can absorb partial extrusion force. In this case, the stress on the peripheral edges of the grooves 3225 of the metal part 3221 is not concentrated, namely, force with which the peripheral edges of the grooves 3225 of the metal part 3221 extrudes the display screen 31 is small. Therefore, a black spot, a bright line, or the like is prevented, to a large degree, from occurring on the display screen 31.

In an implementation, the second surface 3224 is a complete and continuous surface. In this case, a surface that is of a second connection plate member 43 and that is connected to the display screen 31 is a flat surface. When the peripheral edges of the grooves or the through holes on the first support plate 41, the second support plate 42, and the third support plate 43 extrude the first connection plate member 322, the first connection plate member 322 has sufficient hardness and strength to resist extrusion force. Therefore, the first connection plate 322 is prevented from piercing the display screen 31 because the first connection plate 322 is broken.

In a third embodiment, same content as that in the first embodiment is not described again. In other words, most content of the first embodiment may be directly applied to the third embodiment.

Figure 12:
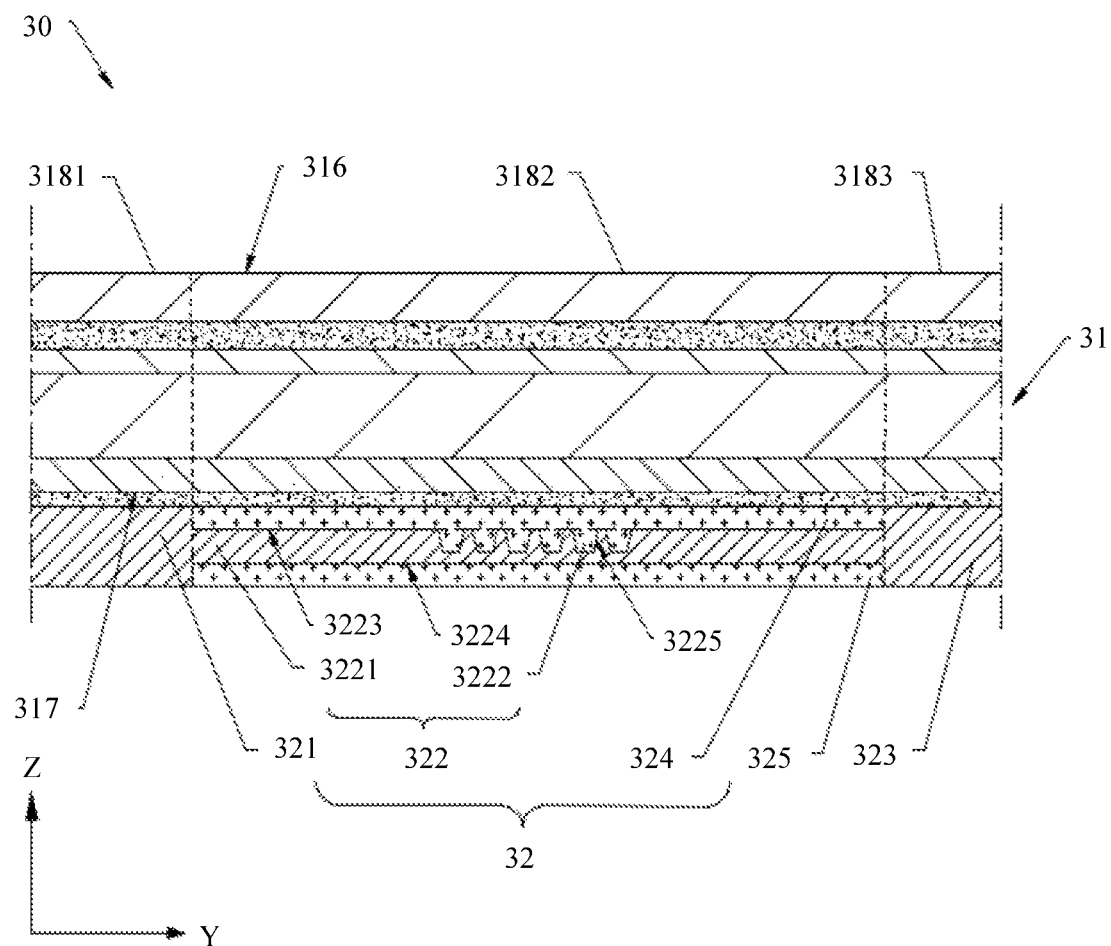
FIG. 12 is a partial schematic cross-sectional diagram of still another implementation of a display module of the electronic device shown in FIG. 4 at a line A-A.

FIG. 12 is a partial schematic cross-sectional diagram of still another implementation of a display module of the electronic device shown in FIG. 4 at a line A-A. The support member 32 further includes a second buffer member 325. The second buffer member 325 is fastened to the first connection plate member 322, and the second buffer member 325 is opposite to the first buffer member 324. In other words, the second buffer member 325 is fastened on the second surface 3224 when the first buffer member 324 is fastened on the first surface 3223. Alternatively, the second buffer member 325 is fastened on the first surface 3223 when the first buffer member 324 is fastened on the second surface 3224. An example in which the second buffer member 325 is fastened on the second surface 3224 when the first buffer member 324 is fastened on the first surface 3223 is used for description below.

For a material and a formation manner of the second buffer member 325, refer to the material and the formation manner of the first buffer member 324 in the first embodiment. Details are not described herein again.

It may be understood that the first buffer member 324 is disposed on the first surface 3223 of the first connection plate member 322, and the second buffer member 325 is disposed on the second surface 3224 of the first connection plate member 322. Therefore, flexibility of the support member 32 facing the bending region 3182 of the display screen 31 is significantly improved. In this case, when the electronic device 100 is unfolded or folded, the support member 32 facing the bending region 3182 can reduce an impact on the display screen 31 in the bending process. In other words, when the electronic device 100 is folded or unfolded, the first buffer member 324 and the second buffer member 325 can jointly absorb the stress generated during bending.

In addition, the first buffer member 324 is disposed on a surface that is of the first connection plate member 322 and that is close to the display screen 31, and the second buffer member 325 is disposed on the surface that is of the first connection plate member 322 and that faces away from the display screen 31. Therefore, when the electronic device 100 is in an unfolded state, the peripheral edges of the grooves or the through holes on the first support plate 41, the second support plate 42, and the third support plate 43 of the rotation apparatus 40 extrude the second buffer member 325. In this way, because the second buffer member 325 has good flexibility, the second buffer member 325 has sufficient flexibility to absorb partial extrusion force. In this case, the stress on the peripheral edges of the grooves 3225 of the metal part 3221 is not concentrated, namely, force with which the peripheral edges of the grooves 3225 of the metal part 3221 extrudes the display screen 31 is small. Therefore, a black spot, a bright line, or the like is prevented, to a large degree, from occurring on the display screen 31. In addition, when the second buffer member 325 transfer partial extrusion force to the first buffer member 324 by using the first connection plate member 322, the first buffer member 324 can also absorb partial extrusion force again. In this case, large extrusion force exerted on the display screen 31 is further reduced. Therefore, a black spot, a bright line, or the like is prevented, to a large degree, from occurring on the display screen 31.

The foregoing describes embodiments of three structures of the display module 30 by using related accompanying drawings. In the three embodiments, the support member 32 has good flexibility, stiffness, and hardness. The following describes a fourth embodiment of the display module 30 by using related accompanying drawings, namely, still another structure of the support member 32.

In a fourth embodiment, same content as that in the first embodiment is not described again. In other words, most content of the first embodiment may be directly applied to the fourth embodiment.

Figure 13:
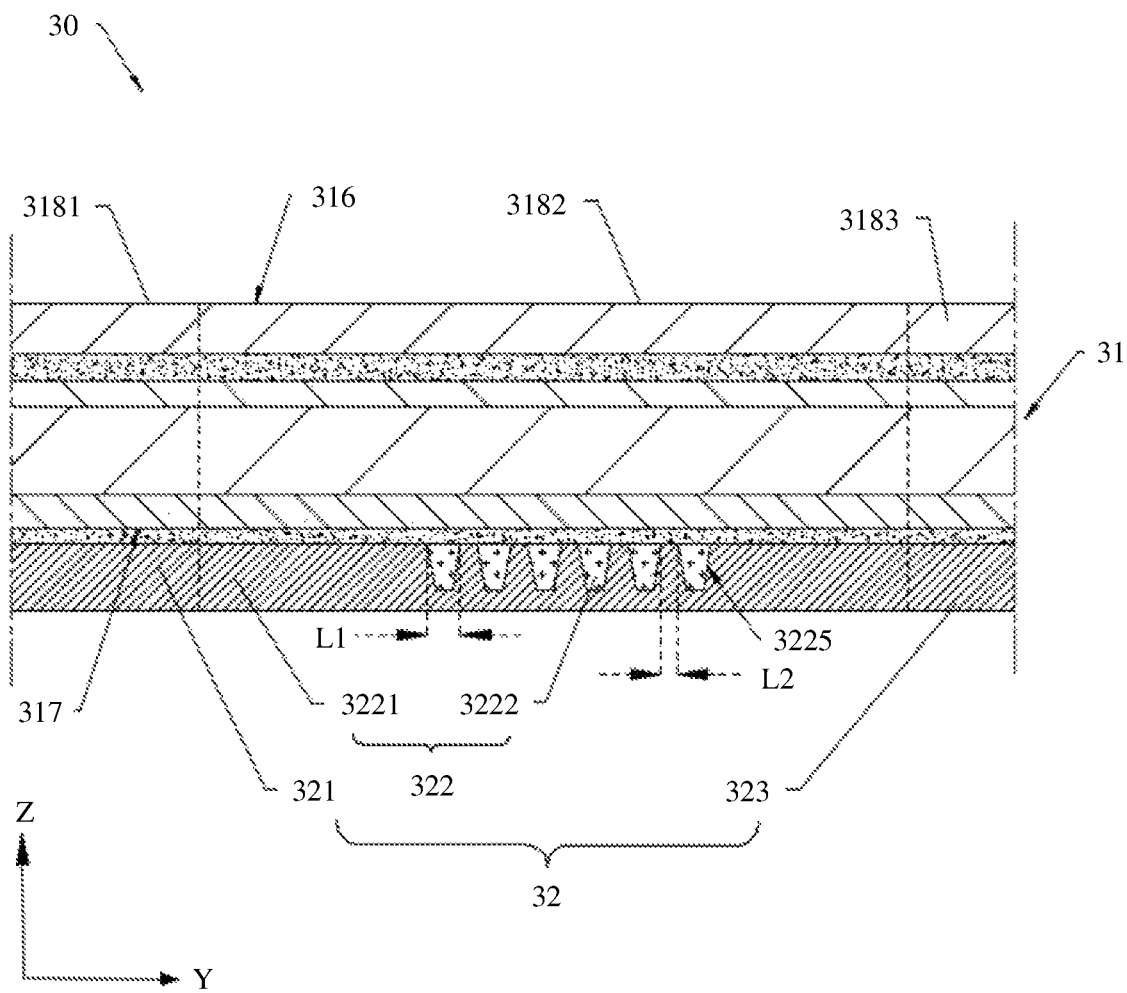
FIG. 13 is a partial schematic cross-sectional diagram of still another implementation of a display module of the electronic device shown in FIG. 4 at a line A-A.

FIG. 13 is a partial schematic cross-sectional diagram of still another implementation of a display module of the electronic device shown in FIG. 4 at a line A-A. In the Z direction, a height of the first connection plate member 322 is equal to the height of the first metal plate member 321 and the height of the second metal plate member 323. In addition, the opening of the groove 3225 of the metal part 3221 faces the display screen 31. In another embodiment, the opening of the groove 3225 may face away from the display screen 31.

In addition, in the Y direction, a width L1 of the organic material part 3222 ranges from 0.15 millimeter to 3 millimeters. For example, L1 is equal to 0.15 millimeter, 0.26 millimeter, 1 millimeter, 2 millimeters, or 3 millimeters. A width L2 of the metal part 3221 between two adjacent organic material parts 3222 ranges from 0.05 millimeter to 0.8 millimeter. L2 is equal to 0.05 millimeter, 0.1 millimeter, 0.2 millimeter, 0.5 millimeter, 0.6 millimeter, or 0.8 millimeter.

It may be understood that hardness of the metal part 3221 are greater than hardness of the organic material parts 3222. It may be understood that stiffness of the metal part 3221 are greater than stiffness of the organic material parts 3222. In this case, the first connection plate member 322 has both the metal part 3221 and the organic material parts 3222, the width L1 of the organic material part 3222 ranges from 0.15 millimeter to 3 millimeters, and the width L2 of the metal part 3221 between two adjacent organic material parts 3222 ranges from 0.05 millimeter to 0.8 millimeter. Therefore, overall stiffness and hardness of the first connection plate member 322 are moderate. In other words, the first connection plate member 322 has good hardness, stiffness, and flexibility. When the electronic device 100 is in an unfolded state, the first connection plate member 322 has sufficient stiffness and hardness to support the bending region 3182 of the display screen 31, to prevent the bending region 3182 of the display screen 31 from collapsing or being pitted, namely, to ensure that the display module 30 has good surface flatness. When the electronic device 100 is unfolded or folded, the first connection plate member 322 does not hinder the display screen 31 from being bent.

In addition, the organic material parts 3222 are disposed in the grooves 3225 of the metal part 3221, so that the metal part 3221 and the organic material parts 3222 form an integral structure, namely, the first connection plate member 322 has good integrity. In this case, firmness of a connection between the metal part 3221 and the organic material parts 3222 is good. Therefore, when the peripheral edges of the grooves or the grooves on the first support plate 41, the second support plate 42, and the third support plate 43 extrude the first connection plate member 322, because the firmness of the connection between the metal part 3221 and the organic material parts 3222 is good, the metal part 3221 is not easily broken to pierce or extrude the display screen 31

In addition, when the peripheral edges of the grooves or the grooves on the first support plate 41, the second support plate 42, and the third support plate 43 of the rotation apparatus 40 extrude the first connection plate member 322, the organic material parts 3222 can absorb partial extrusion force. In this case, the stress on the peripheral edges of the grooves 3225 is not excessively concentrated. Therefore, the optical clear adhesive 39 is prevented from protruding due to excessive extrusion, so that a black spot, a bright line, or the like is prevented from occurring on the display screen 31.

In this implementation, for a disposition manner of the groove 3225, refer to the disposition manner of the groove 3225 in the first embodiment. Details are not described herein again. In addition, for a material and a formation manner of the metal part 3221, refer to the material and the formation manner of the metal part 3221 in the first embodiment. Details are not described herein again. For a material and a formation manner of the organic material part 3222, refer to the material and the formation manner of the organic material part 3222 in the first embodiment. Details are not described herein again.

Figure 14:
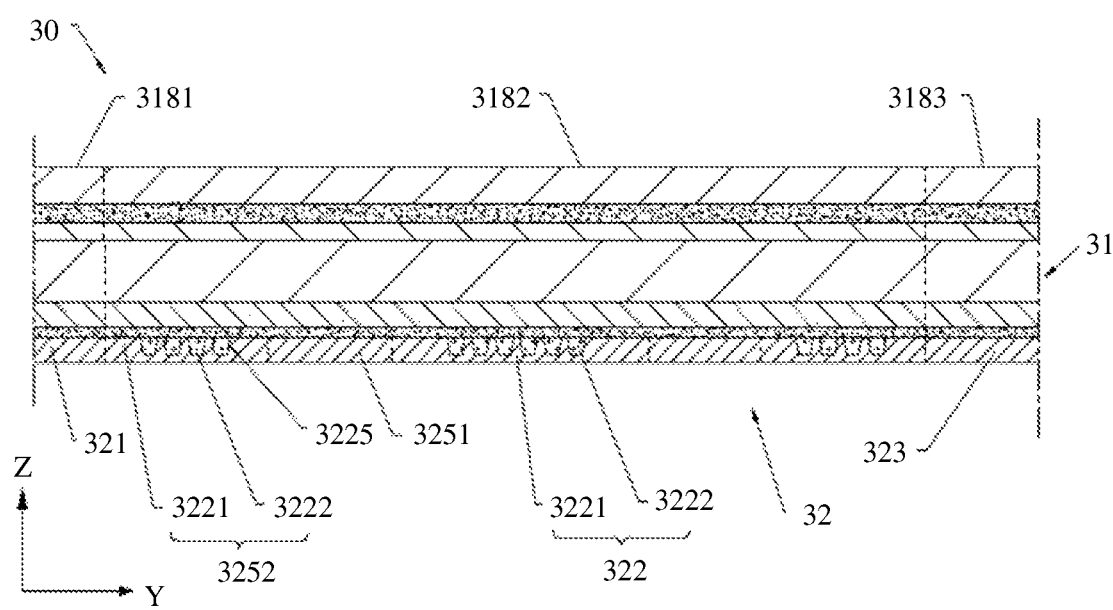
FIG. 14 is a partial schematic cross-sectional diagram of still another implementation of a display module of the electronic device shown in FIG. 4 at a line A-A.

In another embodiment, FIG. 14 is a partial schematic cross-sectional diagram of still another implementation of a display module of the electronic device shown in FIG. 4 at a line A-A. The support member 32 further includes a third metal plate member 3251 and a second connection plate member 3252 that face the bending region 3182 of the display screen 31. In addition, the first metal plate member 321, the second connection plate member 3252, the third metal plate member 3251, the first connection plate member 322, and the second metal plate member 323 are successively connected.

The second connection plate member 3252 includes a metal part 3221 and organic material parts 3222 located in grooves 3225. The organic material parts 3222 are fixedly connected to the metal part 3221.

In addition, in the Y direction, a width range of the organic material part 3222 of the second connection plate member 3252 is the same as a width range of the organic material part 3222 of the first connection plate member 322. Details are not described herein again. A width range of the metal part 3221 of the second connection plate member 3252 is the same as a width range of the metal part 3221 of the first connection plate member 322. Details are not described herein again.

It may be understood that for a disposition manner of the groove 3225 in this implementation, refer to the disposition manner of the groove 3225 of the first connection plate member 322 in the first embodiment. Details are not described herein again. For a material and a disposition manner of the metal part 3221 in this implementation, refer to the material and the disposition manner of the metal part 3221 of the first connection plate member 322 in the first embodiment. Details are not described herein again. For a material and a disposition manner of the organic material part 3222 in this implementation, refer to the material and the disposition manner of the organic material part 3222 of the first connection plate member 322 in the first embodiment. Details are not described herein again.

In this implementation, the second connection plate member 3252 is additionally disposed, so that a region with good flexibility on the support member 32 is increased. Therefore, when the support member 32 is fastened to the display screen 31, the second connection plate member 3252 may be fastened to a region with a large bending angle in the bending region 3182 of the display screen 31, to ensure that the bending region 3182 of the display screen 31 has a good bending effect.

In another implementation, the opening of the groove 3225 may face away from the display screen 31.

In another implementation, the support member 32 may further include a fourth metal plate member, a fifth metal plate member, . . . , and an $S^{th}$ metal plate member. S is an integer greater than or equal to 6. In addition, the support member 32 may further include a third connection plate member, a fourth connection plate member, . . . , and a $P^{th}$ connection plate member. P is an integer greater than or equal to 5. The $P^{th}$ connection plate is connected between two metal plate members. The $P^{th}$ connection plate member is provided with grooves 3225. The $P^{th}$ connection plate member includes a metal part 3221 and organic material pails 3222 located in the grooves 3225. The organic material pails 3222 are fixedly connected to the metal part 3221. Specifically, details are not described again in this implementation.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display module, comprising:
a display screen; and
a support, wherein the display screen comprises a first non-bending region, a bending region, and a second non-bending region that are successively connected, the support is fastened on a non-display side of the display screen, the support comprises a first metal plate, a first connection plate, and a second metal plate that are successively connected, the first metal plate faces the first non-bending region, the first connection plate faces the bending region, the second metal plate faces the second non-bending region, and the first connection plate is bendable;
wherein the first connection plate comprises a first metal part and first organic material parts, a plurality of grooves extend in a first surface of the first metal part, and the first organic material parts are located in the plurality of grooves and are fixedly connected to the first metal part;
wherein the support further comprises a first buffer, the first buffer is contained within a plurality of side walls that extend within a width defined by the bending region located between the first metal plate and the second metal plate, and the first buffer is stacked on the first surface of the first metal part and is fixedly connected to the first organic material parts;
wherein the plurality of grooves are arranged in a plurality of first groove groups, the plurality of first groove groups are arranged in a first direction, each first groove group comprises a plurality of first grooves, the plurality of first grooves in a same first groove group are arranged at intervals in a second direction, the plurality of first grooves in two adjacent first groove groups alternate with each other, the second direction is a direction in which the first metal plate faces the second metal plate, and the first direction is perpendicular to the second direction; and
wherein each first groove of each plurality of first grooves is a strip hole, an extension direction of the respective first groove is parallel to the first direction, and a width of the respective first groove in the second direction ranges from 0.15 millimeter to 3 millimeters.

2. The display module according to claim 1, wherein the first surface of the first metal part faces the display screen, a second surface of the first metal part is opposite to the first surface, and the second surface is a complete and continuous surface.

3. The display module according to claim 2, wherein the support further comprises a second connection plate and a third metal plate that face the bending region of the display screen, and the first metal plate, the second connection plate, the third metal plate, the first connection plate, and the second metal plate are successively connected;
   wherein grooves extend in the second connection plate, and the second connection plate comprises a second metal part and second organic material parts; and
   wherein the support further comprises a third buffer, the third buffer is located between the first metal plate and the third metal plate, and the third buffer is stacked on the second connection plate.

4. The display module according to claim 1, wherein the first surface of the first metal part faces away from the display screen, a second surface of the first metal part is opposite to the first surface, and the second surface is a complete and continuous surface.

5. The display module according to claim 1, wherein the support further comprises a second connection plate and a third metal plate that face the bending region of the display screen, and the first metal plate, the second connection plate, the third metal plate, the first connection plate, and the second metal plate are successively connected;
   wherein grooves extend in the second connection plate, and the second connection plate comprises a second metal part and second organic material parts; and
   wherein the support further comprises a third buffer, the third buffer is located between the first metal plate and the third metal plate, and the third buffer is stacked on the second connection plate.

6. The display module according to claim 1, wherein a second surface of the first metal part is opposite to the first surface of the first metal part, the support further comprises a second buffer, and the second buffer is stacked on the second surface of the first metal part.

7. The display module according to claim 1, wherein in a thickness direction of the display module, a thickness from a bottom wall of a groove of the plurality of grooves to a surface of the first metal part that faces away from the display screen ranges from 0.01 millimeter to 0.05 millimeter.

8. The display module according to claim 1, wherein a material of the first organic material parts comprises P4U, and the material of the first organic material parts further comprises at least one of polyurethane (PU), thermoplastic polyurethane (TPU), thermoplastic elastomer (TPE), thermo-plastic-rubber material (TPR), thermoplastic vulcanizate (TPV), or ethylene-vinyl acetate copolymer (EVA).

9. An electronic device, comprising:
   a housing; and
   a display module mounted in the housing, wherein the display module comprises:
      a display screen; and
      a support, wherein the display screen comprises a first non-bending region, a bending region, and a second non-bending region that are successively connected, the support is fastened on a non-display side of the display screen, the support comprises a first metal plate, a first connection plate, and a second metal plate that are successively connected, the first metal plate faces the first non-bending region, the first connection plate faces the bending region, the second metal plate faces the second non-bending region, and the first connection plate is bendable;
   wherein the first connection plate comprises a first metal part and first organic material parts, a plurality of grooves extend in a first surface of the first metal part, and the first organic material parts are located in the plurality of grooves and are fixedly connected to the first metal part;
   wherein the support further comprises a first buffer, the first buffer is contained within a plurality of side walls that extend within a width defined by the bending region located between the first metal plate and the second metal plate, and the first buffer is stacked on the first surface of the first metal part and is fixedly connected to the first organic material parts;
   wherein the plurality of grooves are arranged in a plurality of first groove groups, the plurality of first groove groups are arranged in a first direction, each first groove group comprises a plurality of first grooves, the plurality of first grooves in a same first groove group are arranged at intervals in a second direction, the plurality of first grooves in two adjacent first groove groups alternate with each other, the second direction is a direction in which the first metal plate faces the second metal plate, and the first direction is perpendicular to the second direction; and
   wherein each first groove of each plurality of first grooves is a strip hole, an extension direction of the respective first groove is parallel to the first direction, and a width of the respective first groove in the second direction ranges from 0.15 millimeter to 3 millimeters.

10. A display module, comprising:
    a display screen; and
    a support;
    wherein the display screen comprises a first non-bending region, a bending region, and a second non-bending region that are successively connected, the support is fastened on a non-display side of the display screen, the support comprises a first metal plate, a first connection plate, and a second metal plate that are successively connected, the first metal plate faces the first non-bending region, the first connection plate faces the bending region, the second metal plate faces the second non-bending region, and the first connection plate is bendable;
    wherein the first connection plate comprises a metal part and organic material parts, a plurality of grooves extend a first surface of the metal part, and the organic material parts are located in the plurality of grooves and are fixedly connected to the metal part;
    wherein in a thickness direction of the display module, a height of the metal part is equal to a height of the first metal plate and a height of the second metal plate;
    wherein in a second direction, a width of the organic material parts ranges from 0.15 millimeter to 3 millimeters, and a width of the metal part between two adjacent organic material parts ranges from 0.05 millimeter to 0.8 millimeter, and wherein the second direction is a direction in which the first metal plate faces the second metal plate;
    wherein the plurality of grooves are arranged in a plurality of first groove groups, the plurality of first groove groups are arranged in a first direction, each first groove group comprises a plurality of first grooves, the plurality of first grooves in a same first groove group are arranged at intervals in the second direction, the plurality of first grooves in two adjacent first groove groups alternate with each other, and the first direction is perpendicular to the second direction; and
    wherein each first groove of each plurality of first grooves is a strip hole, an extension direction of the respective first groove is parallel to the first direction, and a width of the respective first groove in the second direction ranges from 0.15 millimeter to 3 millimeters.

11. The display module according to claim 10, wherein a material of the organic material parts comprises P4U, and the material of the organic material parts further comprises at least one of polyurethane (PU), thermoplastic polyurethane (TPU), thermoplastic elastomer (TPE), thermo-plastic-rubber material (TPR), thermoplastic vulcanizate (TPV), or ethylene-vinyl acetate copolymer (EVA).

12. The display module according to claim 10, wherein in the thickness direction of the display module, a thickness from a bottom wall of a groove of the plurality of grooves to a surface of the metal part that faces away from the display screen ranges from 0.01 millimeter to 0.05 millimeter.

13. The display module according to claim 1, wherein the plurality of side walls each terminate at a boundary of the bending region.

14. The display module according to claim 1, wherein the plurality of grooves span a smaller width than the width spanned by the first buffer.

* * * * *